US009647431B1

(12) United States Patent
Collum

(10) Patent No.: US 9,647,431 B1
(45) Date of Patent: May 9, 2017

(54) WALL MOUNTED PERSONAL CABINET FOR JEWELRY AND OTHER ITEMS

(76) Inventor: Pamela K. Collum, Houston, TX (US)

( * ) Notice: Subject to any disclaimer, the term of this patent is extended or adjusted under 35 U.S.C. 154(b) by 1123 days.

(21) Appl. No.: 13/068,636

(22) Filed: May 17, 2011

(51) Int. Cl.
*A47B 67/02* (2006.01)
*H02B 1/40* (2006.01)
*E05G 1/04* (2006.01)

(52) U.S. Cl.
CPC *H02B 1/40* (2013.01); *E05G 1/04* (2013.01)

(58) Field of Classification Search
CPC .... H02B 1/40; H02B 1/44; E05G 1/04; A47B 45/00; A47B 46/00; A47B 67/02
USPC ....... 312/224, 226, 227, 242, 245, 246, 309, 312/310, 319.1, 204, 205; 40/721, 722, 40/723, 732
See application file for complete search history.

(56) References Cited

U.S. PATENT DOCUMENTS

| | | | | | |
|---|---|---|---|---|---|
| 191,795 | A | | 6/1877 | Bowers et al. | |
| 1,803,218 | A | | 4/1931 | Sunde | |
| D279,872 | S | | 3/1957 | Wrablica, Jr. | |
| 3,140,134 | A | | 7/1964 | Nairn | |
| 3,620,404 | A | | 11/1971 | Grasso | |
| 3,876,271 | A | | 4/1975 | Skirlock | |
| D237,234 | S | | 10/1975 | Wertz | |
| 4,076,350 | A | * | 2/1978 | Crist | E04H 1/1238 312/242 |
| 4,155,608 | A | | 5/1979 | Orlewicz | |
| 4,304,447 | A | | 12/1981 | Ellwood et al. | |
| 4,413,736 | A | | 11/1983 | Nibling | |
| 4,681,380 | A | * | 7/1987 | Carlin | A47B 81/002 312/242 |
| 4,800,822 | A | | 1/1989 | Adkins | |
| 4,941,716 | A | | 7/1990 | Rome et al. | |
| 5,016,772 | A | | 5/1991 | Wilk | |
| 5,141,300 | A | | 8/1992 | Ciesla | |
| 5,368,378 | A | | 11/1994 | Curtis | |
| 5,549,375 | A | | 8/1996 | Pagliaccio | |
| D384,821 | S | | 10/1997 | Sugar | |
| D384,822 | S | | 10/1997 | Sugar | |
| D384,823 | S | | 10/1997 | Sugar | |
| 5,758,936 | A | | 6/1998 | Baughan | |
| 5,954,411 | A | * | 9/1999 | Katz | A47B 67/02 312/224 |
| 6,059,388 | A | | 5/2000 | Wheatley, Jr. | |
| 6,349,494 | B1 | | 2/2002 | Haggarty-Robbins | |
| 6,860,386 | B2 | | 3/2005 | Wolf | |

* cited by examiner

*Primary Examiner* — James O Hansen
(74) *Attorney, Agent, or Firm* — James L. Jackson

(57) ABSTRACT

A personal cabinet for jewelry, tobacco products and implements or other items has a housing mount. An actuator housing is located within the housing mount and defines an actuator housing receptacle. A spring urged inner case is movably connected with the actuator housing within the actuator housing receptacle and is linearly moveable to a contracted position and a projected position relative to the actuator housing and housing mount. A latch mechanism retains the inner case at the contracted position and a latch release mechanism is operated to release the inner case for spring urged linear movement to its projected position. A closure is pivotally mounted to the inner case and can be opened only when the inner case has been moved to its projected position.

14 Claims, 23 Drawing Sheets

WALL MOUNTED PERSONAL CABINET FOR JEWELRY AND OTHER ITEMS

RELATED PROVISIONAL APPLICATION

Applicant hereby claims the benefit of U.S. Provisional Patent Application No. 60/809,371, filed on May 30, 2006 by Pamela K. Collum and entitled “Concealed Storage Cabinet for Jewelry and Other Small Items”.

BACKGROUND OF THE INVENTION

This invention relates generally to personal cabinetry for personal items such as jewelry and particularly concerns wall mounted personal cabinetry that incorporates a locking mechanism for limiting access to persons having the appropriate information or access devices for unlocking and opening the cabinetry. Even more particularly, the present invention concerns the provision of personal cabinetry that is in the form of a decorative cabinet having the appearance of framed artwork so that its use as a cabinet is not obvious. The present invention also concerns a personal cabinet that can be hung on a wall in the nature of a framed item of artwork or can be mounted within a wall structure to provide the pleasing decorative appearance of a wall mounted item of artwork.

DESCRIPTION OF THE PRIOR ART

Various types of personal cabinets, such as wall mounted jewelry cabinets, humidors for tobacco products and implements, liquor cabinets and gun cabinets, have been developed and are identified in the prior art. Some wall mounted cabinets are intended for mounting on a wall of a building and some are intended to be mounted within a wall structure. In many cases the cabinets are intended to appear as wall mounted artwork, thus serving to conceal the contents thereof from easy inspection. Other decorative personal cabinetry is intended to rest on the surface of a furniture item and may serve as a humidor for tobacco products or may serve as a container for personal items. In some cases the prior art decorative personal cabinetry is provided with locking mechanisms for closures to lock stored personal items.

SUMMARY OF THE INVENTION

It is a feature of the present invention to provide a novel personal cabinet that can be mounted on an interior wall of a building such as a residence or can be installed within the wall;

It is also a feature of the present invention to provide a novel personal cabinet having a base structure and a structure defining a storage compartment that is moveable to a contracted position within a receptacle that is defined by the base structure and is locked in place within the receptacle and is moveable to a projected position for access to the contents of the storage compartment;

It is another feature of the present invention to provide a novel personal cabinet having a spring urged mechanism causing spring energized movement of the storage compartment to its projected position upon being unlocked;

It is also a feature of the present invention to provide a novel personal cabinet having a hinge mounted closure for the storage compartment and having geometry that permits opening of the closure only when the storage compartment has been moved from its contracted position to its projected position, thus minimizing easy unauthorized access to the storage compartment.

Another feature of the present invention is a personal cabinet having a moveable internal compartment structure and having moveable trays, a moveable ear-ring mounting device and having one or more supports for hanging necklaces and bracelets in organized and easily accessible fashion.

Briefly, the present invention is a personal cabinet system for personal items such as jewelry, and is provided in a decorative form designed either to be hung on a wall in the manner of a framed picture or to be set at least partially within the wall structure of a residence or other building. A personal storage cabinet is provided that may have the general appearance of a wall hung item of framed artwork when closed and provides for convenient and organized storage of personal items. This invention is described herein particularly as a jewelry storage system, but it may provide for storage of many different types of collectibles and other personal items. For example, it may function as a humidor and provide storage for cigars, pipe tobacco, smoking pipes and other smoking implements. One model of the personal storage cabinet is intended to be hung on an interior wall of a residence, without altering the wall structure other than providing conventional artwork hangers or installing suitable wall mounted hanger devices such as a French cleat or screws or other suitable fasteners for supporting relatively heavy framed artwork. Thus, even though the storage cabinet and its contents may be heavier than a typical framed picture of the same size, the support system for the storage cabinet must be sufficient to enable it to be adequately supported by a wall structure. It is intended that the personal cabinet be advertised and sold as a high quality furniture item, being composed of decorative wood components and employing suitable artwork such as a painting, framed print, glass or mosaic tile, mirror or other object having a pleasing appearance. However, the personal cabinet may also be composed of any suitable polymer material or composites of polymer and other materials. Another model of the personal cabinet is designed to be recessed within a wall structure or hung within an opening of a wall, thus requiring that its mounting or support system be adequate for its efficient and safe support. While a wall hung cabinet model is shown in the drawings it is to be understood that a “built in” model may also be provided wherein the personal cabinet is recessed within a wall structure and is supported by or between the studs or other structural members of the wall.

The personal cabinet apparatus may have an outer frame of rectangular, round, oval or any other desirable configuration having the general appearance of a conventional picture frame. The personal cabinet also has an actuator housing that provides for support and positioning of an inner case that defines an inner case compartment.

For storage of necklaces and bracelets, several hanger members are mounted to the back wall of the inner storage member. After unlocking and opening the personal storage mechanism the user can simply reach in and remove one or more necklaces or bracelets. For storage of rings, ear-rings and other small jewelry items, or collectibles, several compartmented storage trays are pivotally mounted within the inner case compartment. For access to these jewelry items a selected one of the storage trays is pivoted outwardly. The compartmented storage trays may be removably pivotally mounted so that they can be removed from the inner case compartment. This feature permits a user to temporarily place a compartmented storage tray on a dressing table or the like to facilitate convenient and efficient use of the items contained therein. For storage of ear pin jewelry a partition-like structure is mounted within the inner storage member and has a moveable section permitting a portion of it to be pulled outwardly for access. This moveable section defines multiple openings through which the pins or studs of the ear pins extend. The retainers of the ear pins secure the ear pins in place on the moveable section of the partition-like structure.

The inner case is generally in the form of a box-like structure having side walls, a closed rear or bottom wall and being moveable to contracted and extended or projected positions within a receptacle that is defined within the actuator housing structure. The inner case is guided relative to the actuator housing structure by a slot and guide arrangement. A number of springs are interposed in force transmitting relation with the actuator housing structure and the inner case and apply continuous spring force to the moveable inner case. When the moveable inner case is pushed into fully seated relation within the receptacle of the actuator housing structure the springs are additionally loaded. A latch mechanism releasably secures the moveable inner case at its contracted position. When the latch mechanism is released, the springs move the moveable inner case from its contracted position to the extended or projected position. A closure member is pivotally mounted to the moveable inner case by a hinge that is set back from an edge of the closure member so that a portion of the moveable inner case interferes with opening of the closure member when the moveable inner case is at its contracted position. It should be noted that only at the extended or use position of the moveable inner case can the closure or door panel be completely opened. Additionally, the closure member or door of the personal cabinet may be provided with a mechanical or electromechanical locking mechanism as further assurance that the storage compartment may be accessed only by a person having authority to do so.

The fixed actuator housing structure is intended to be removably mounted within a suitable housing mount receptacle of a picture frame structure or a wall structure. This feature permits the actuator housing structure to be removed from its housing mount receptacle in the event repairs are needed. The inner case has guide members mounted to its top, bottom and external guides. These guide members are in the form of guide bars or strips that project outwardly from the exterior surfaces of the inner case. The moveable inner case is located internally of the fixed actuator housing and defines two guide slots internally of each of its top, bottom and sides. These guide slots receive respective guide members and therefore serve to guide the moveable inner case as it is moved from a contracted position to an extended or use position.

A closure or door member is mounted to the moveable inner case by a hinge or hinges that establish a pivot point that is offset from an edge of the closure. When the closure is closed the outer moveable inner case member can be moved to its contracted position and latched. The closure member cannot be opened when the moveable frame member is contracted and latched.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

IN THE DRAWINGS

Figure 1:
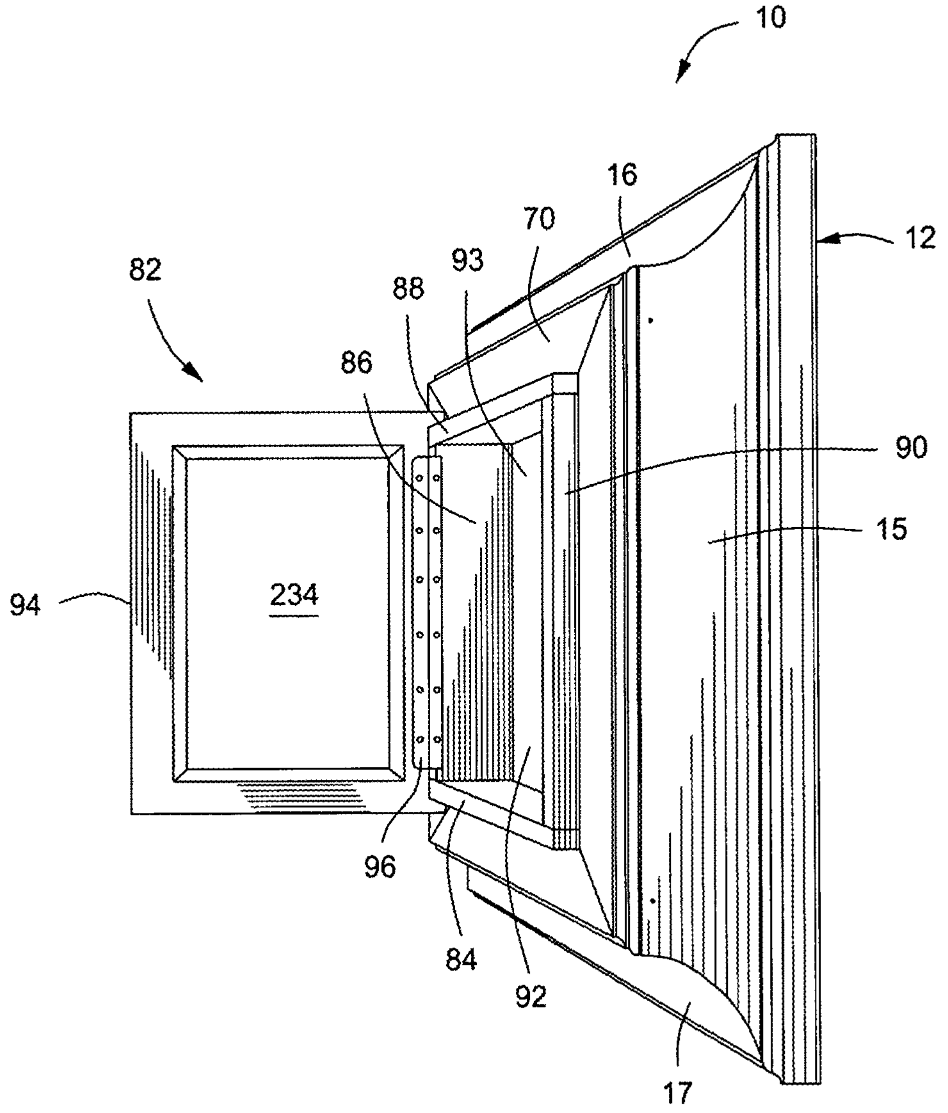

FIG. 1 is a side perspective view illustrating a wall mounted personal cabinet embodying the principles of the present invention and showing the personal cabinet in its open condition.

Figure 2:
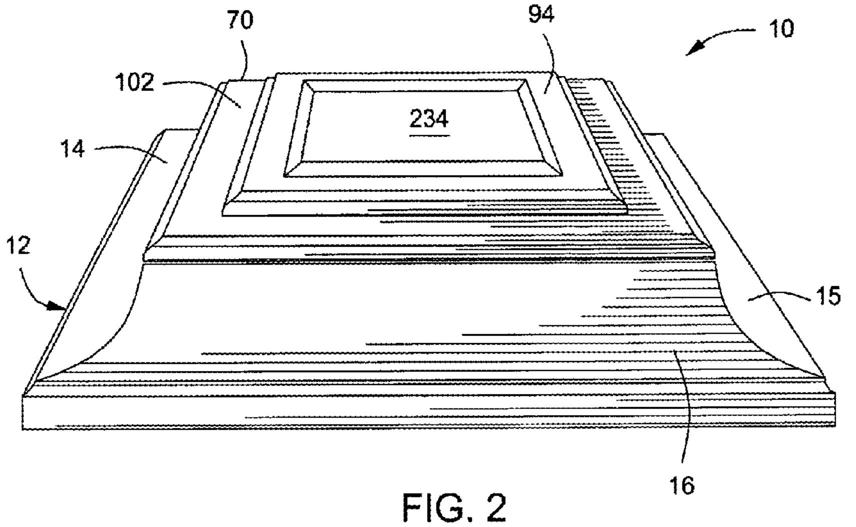
Figure 3:
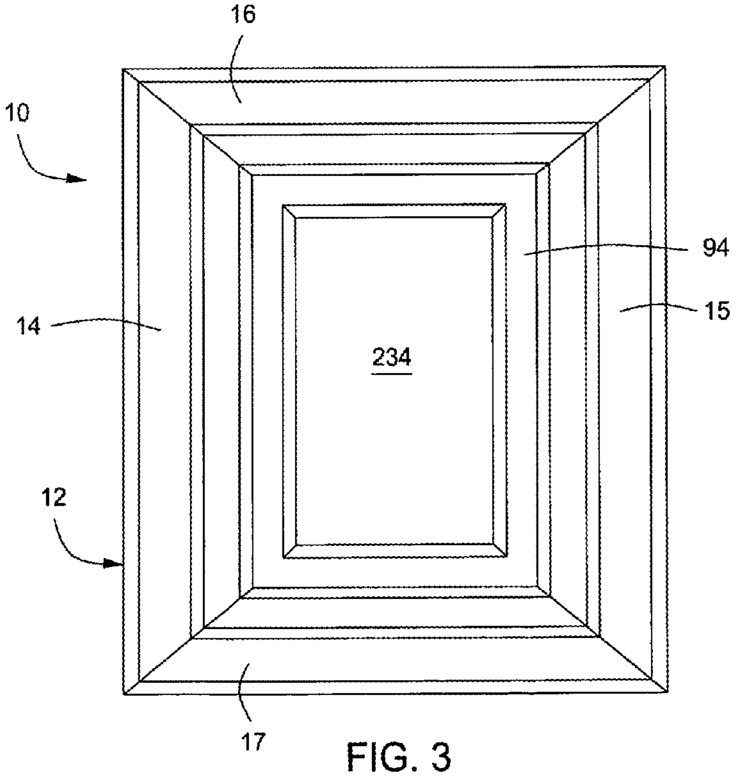
Figure 4:
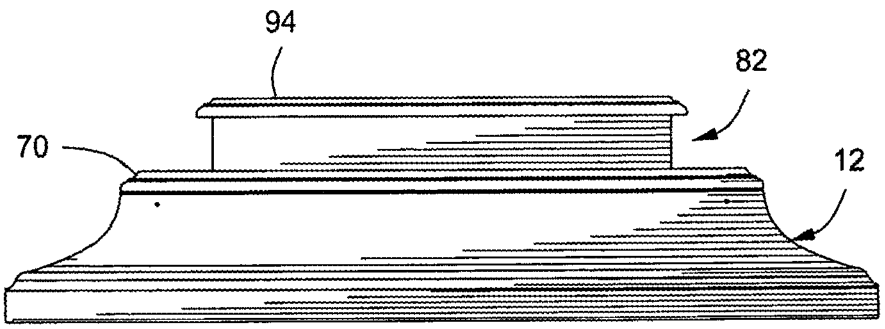
Figure 5:
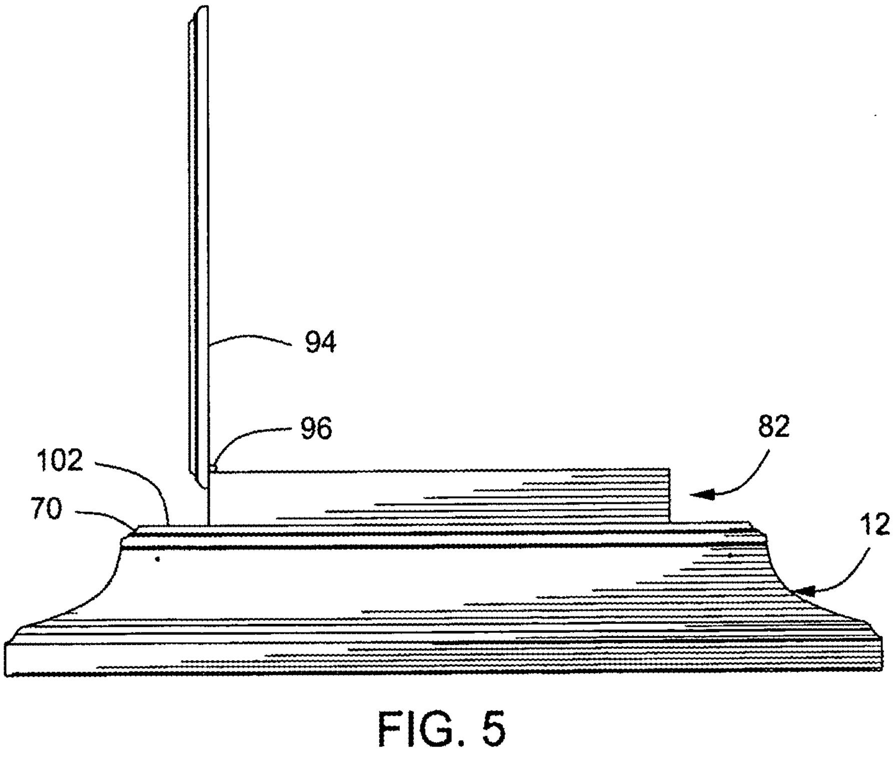
Figure 6:
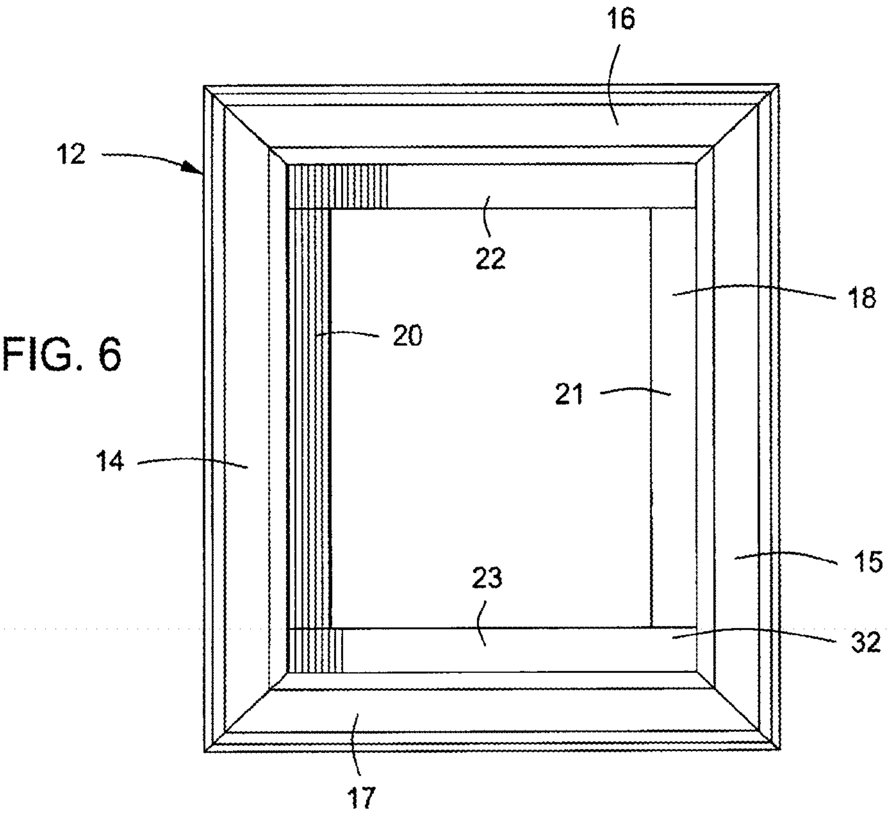
Figure 7:
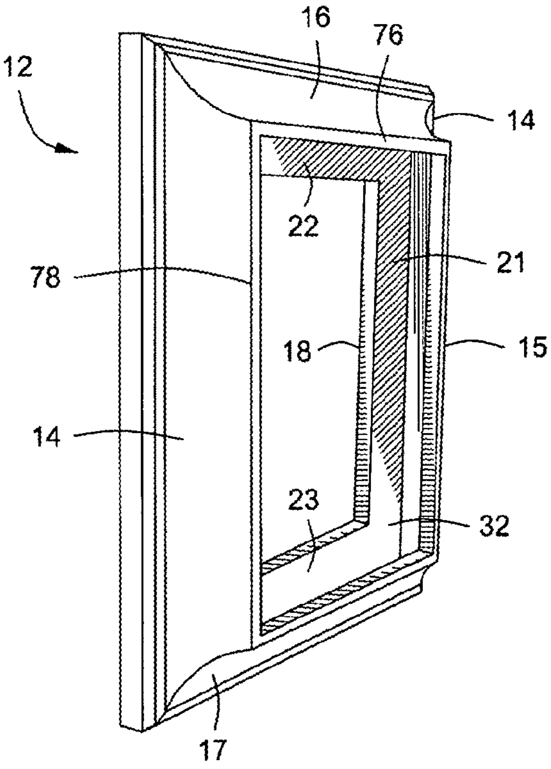
Figure 8:
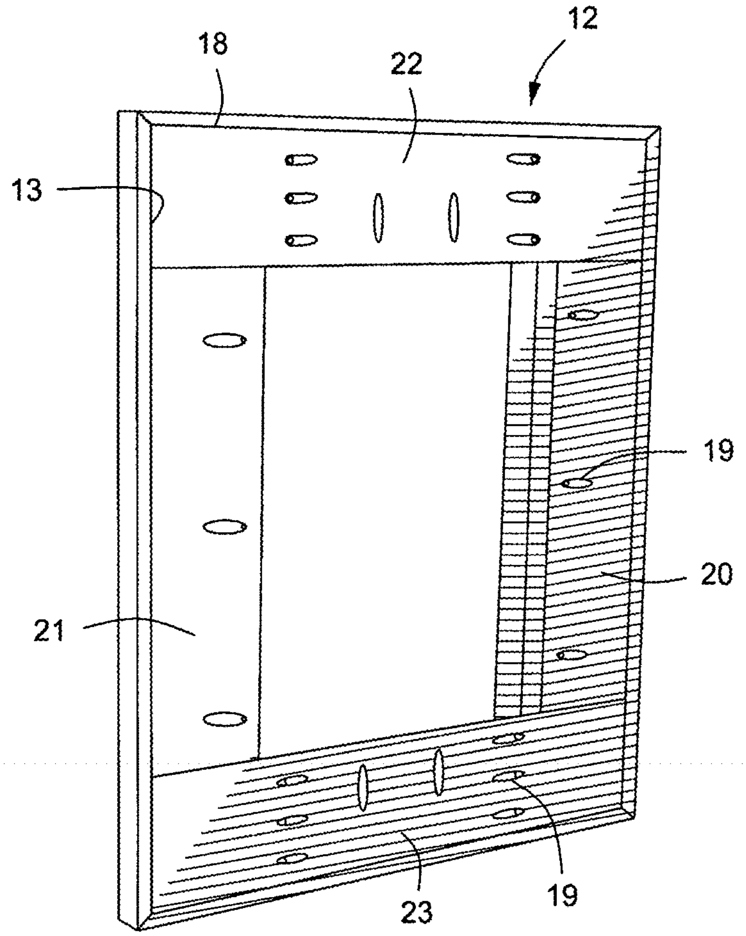
Figure 9:
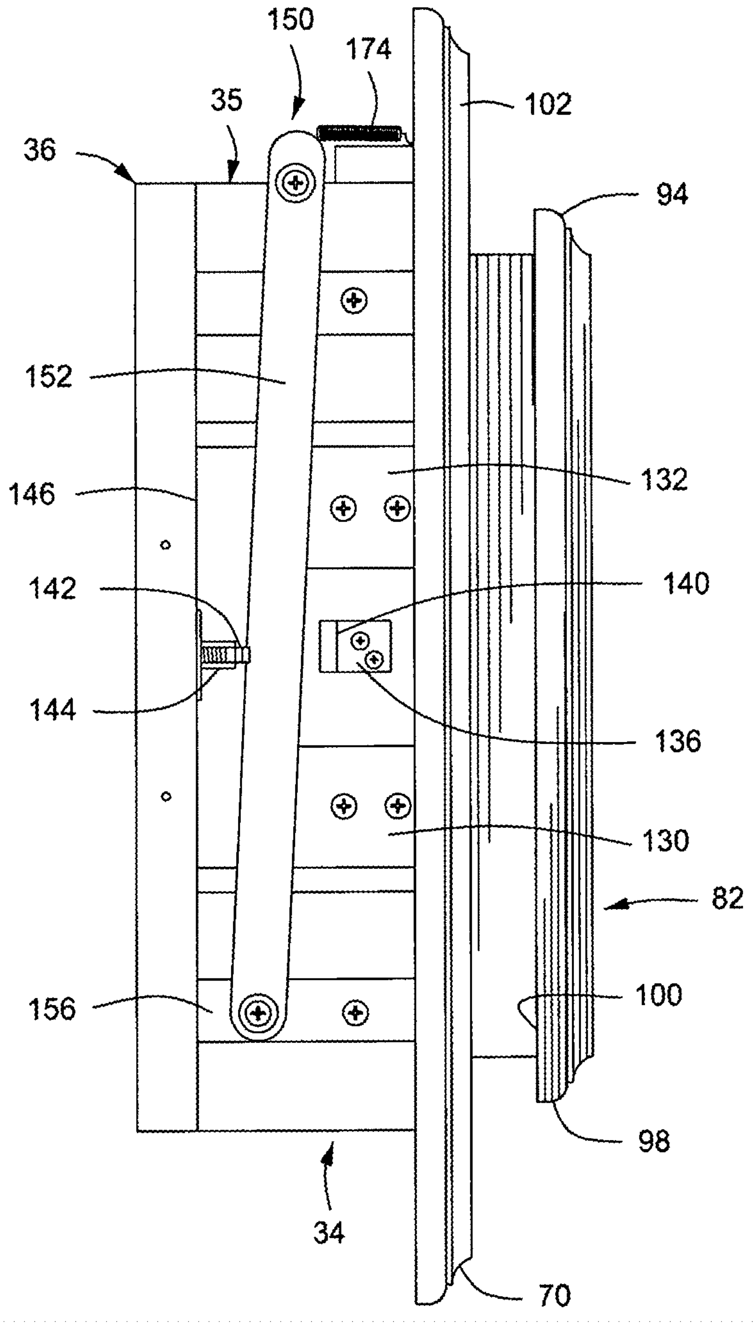
Figure 10:
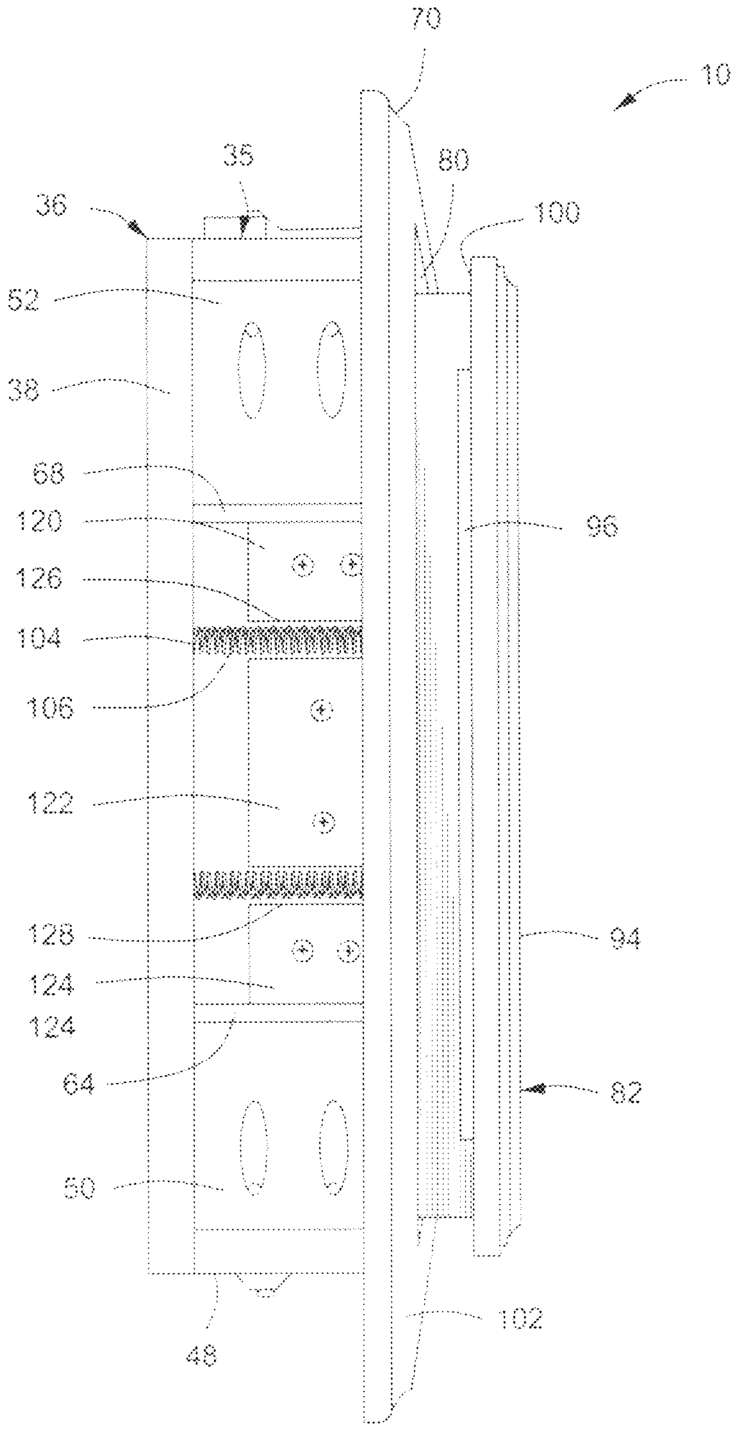
Figure 11:
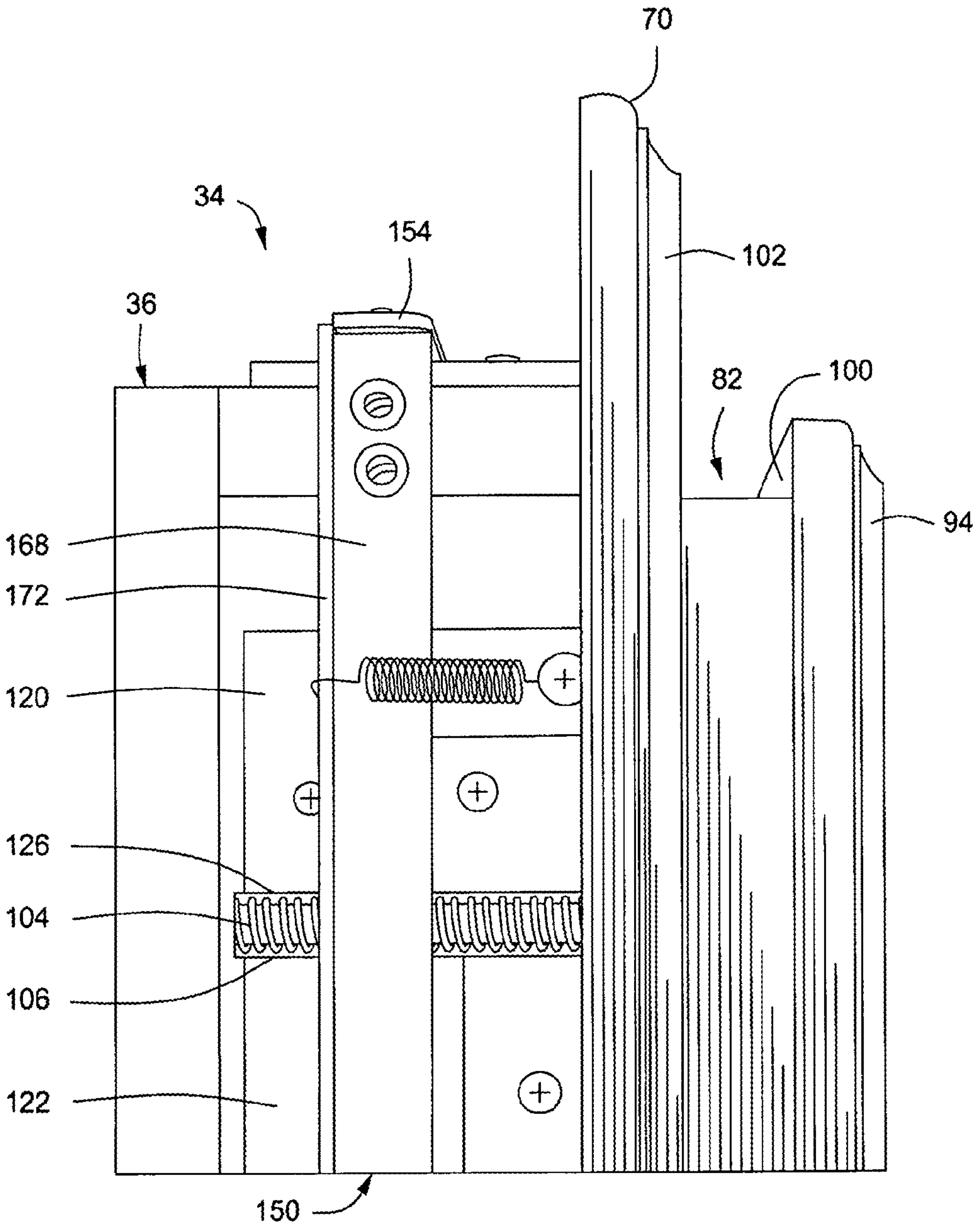
Figure 12:
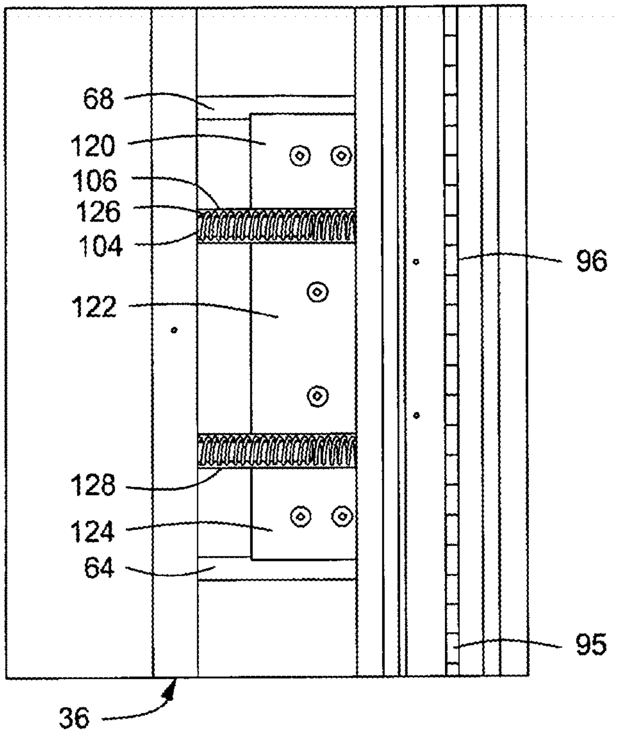
Figure 13:
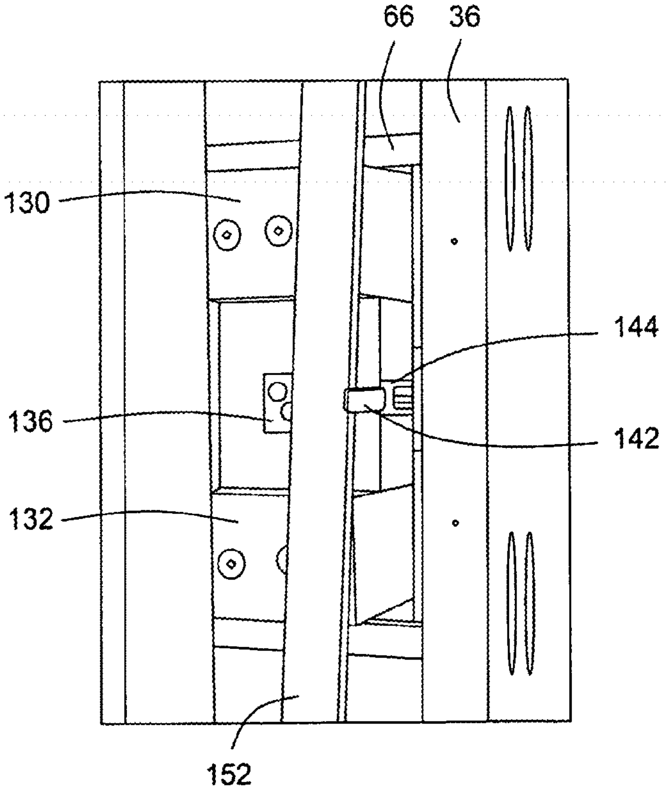
Figure 14:
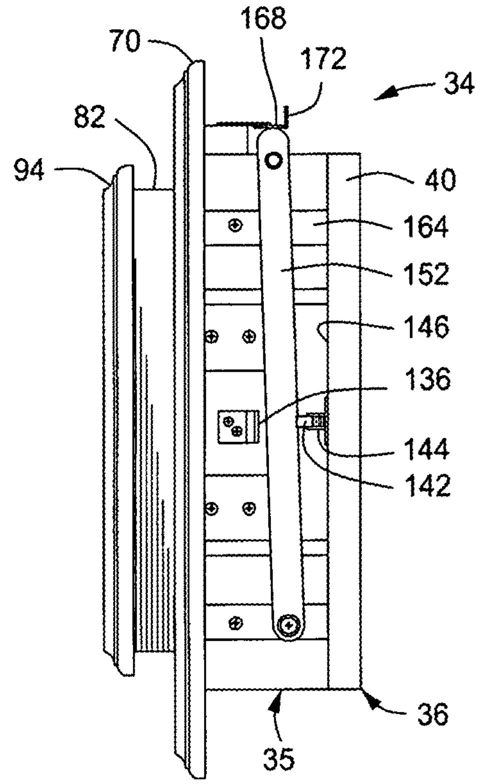
Figure 15:
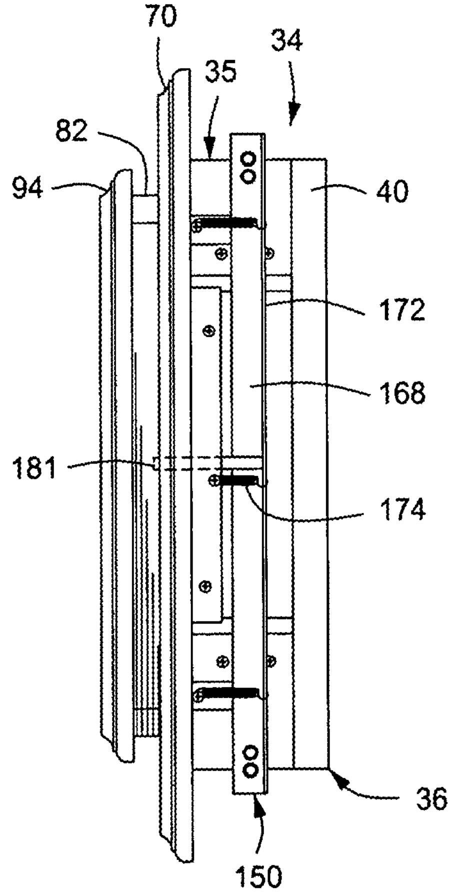
Figure 16:
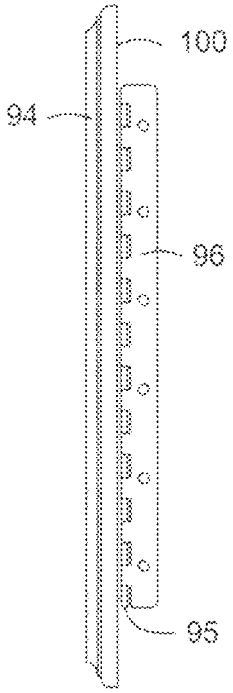
Figure 17:
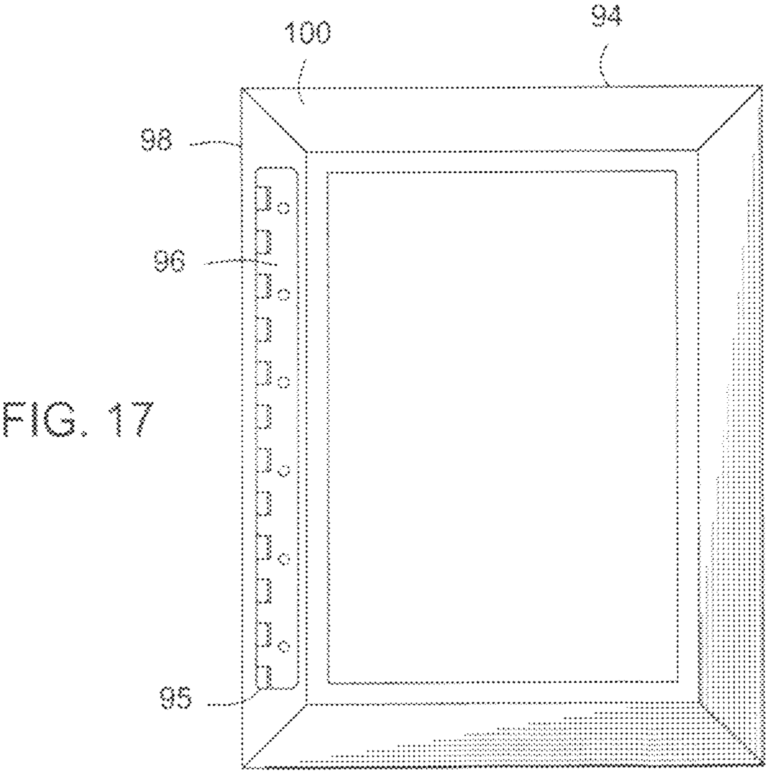
Figure 18:
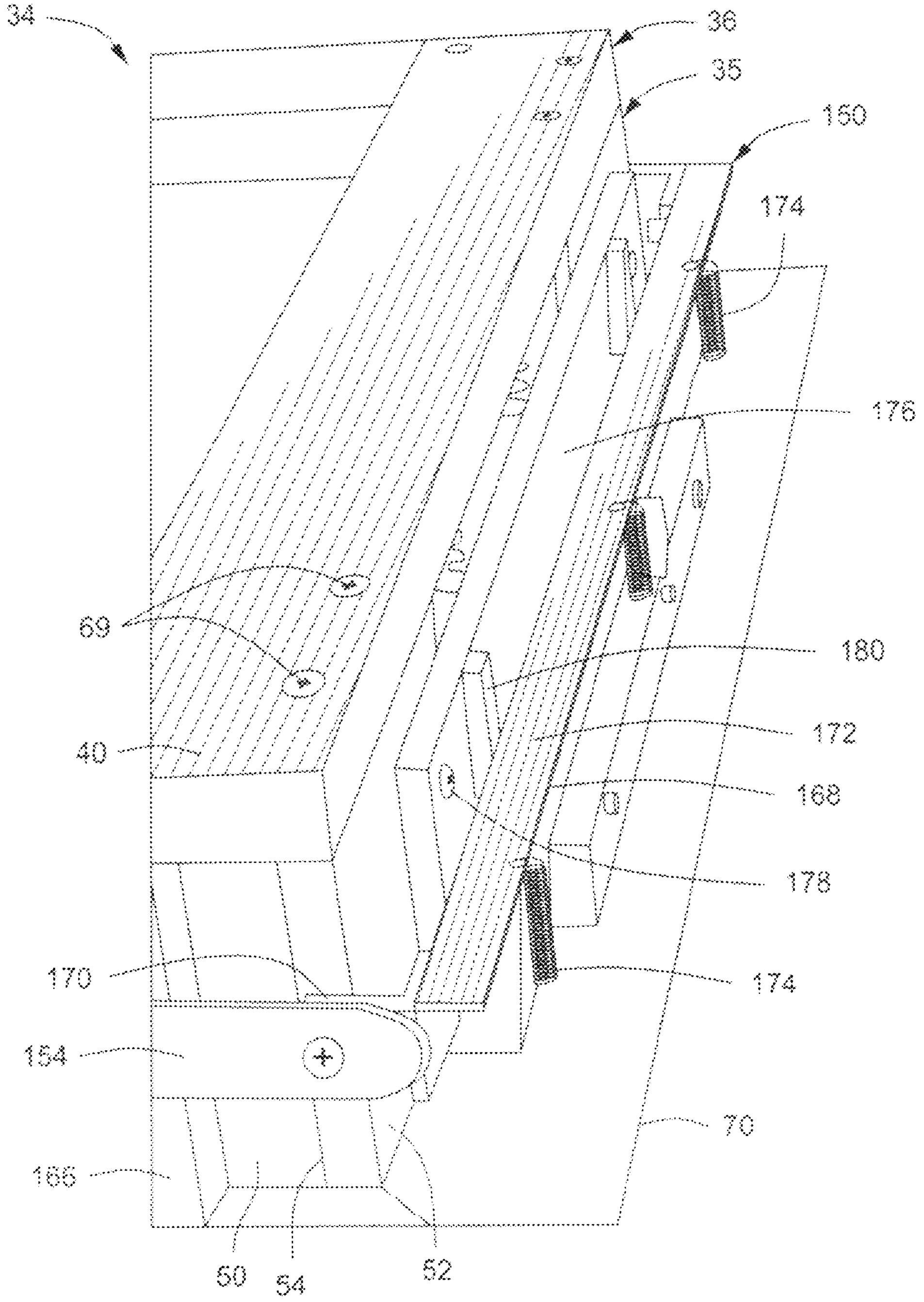
Figure 19:
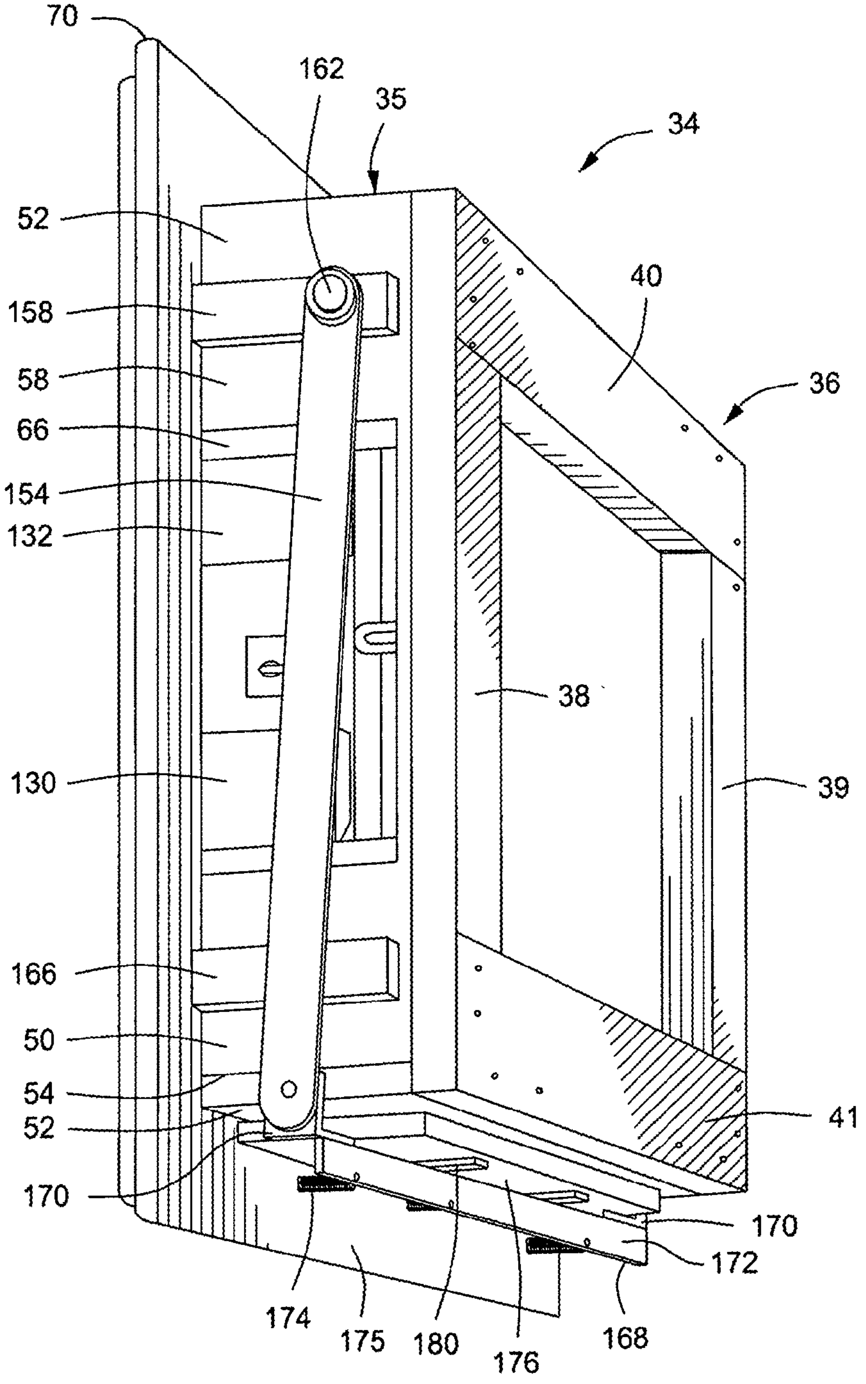
Figure 20:
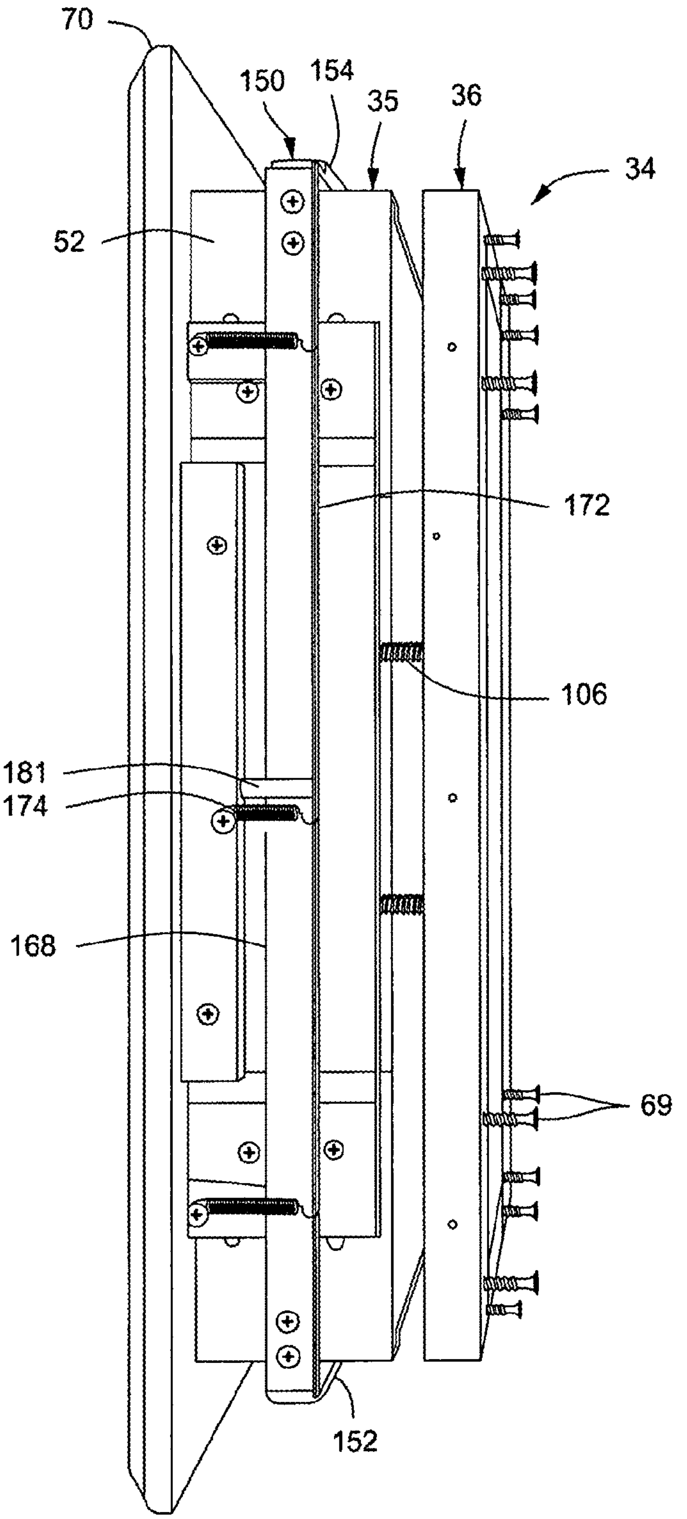
Figure 21:
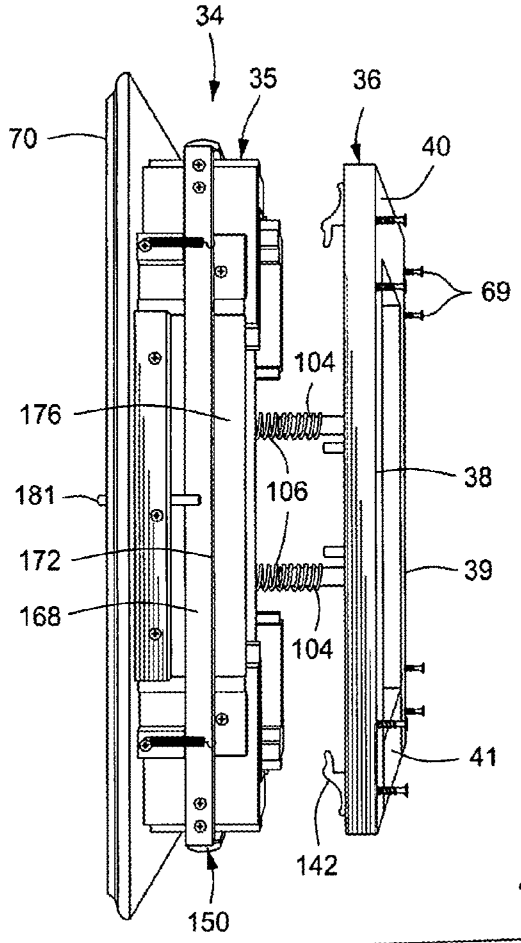
Figure 22:
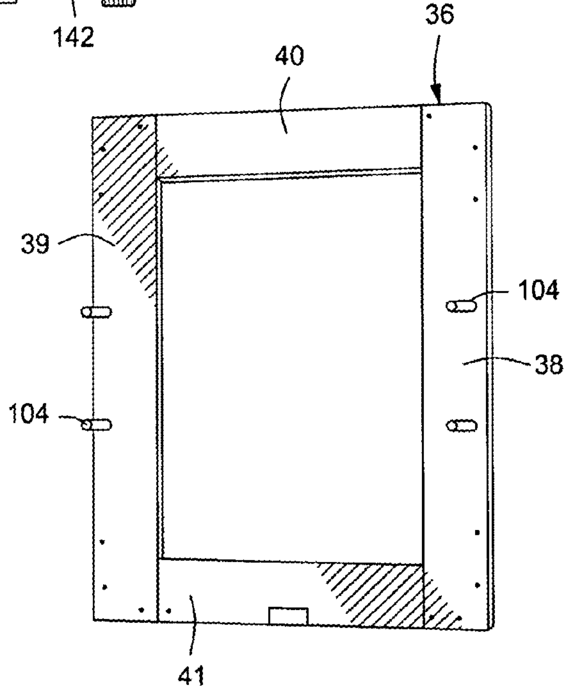
Figure 23:
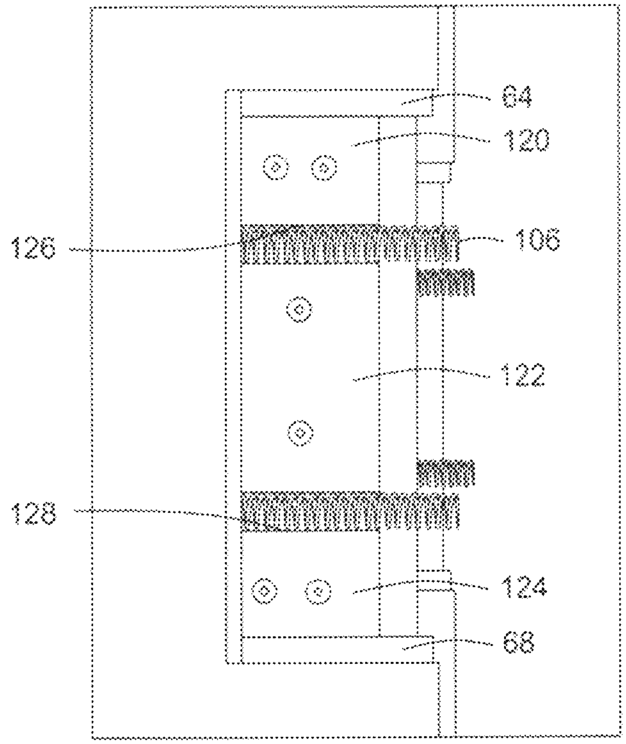
Figure 24:
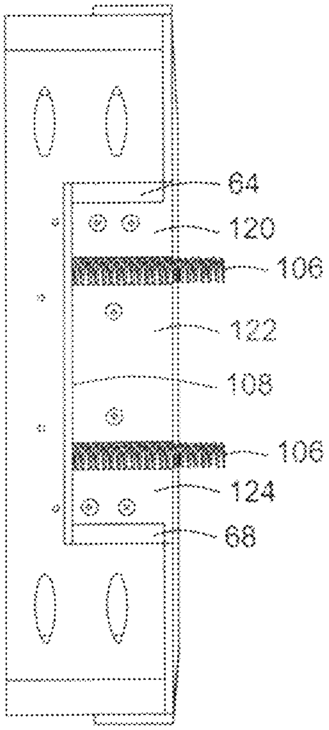
Figure 25:
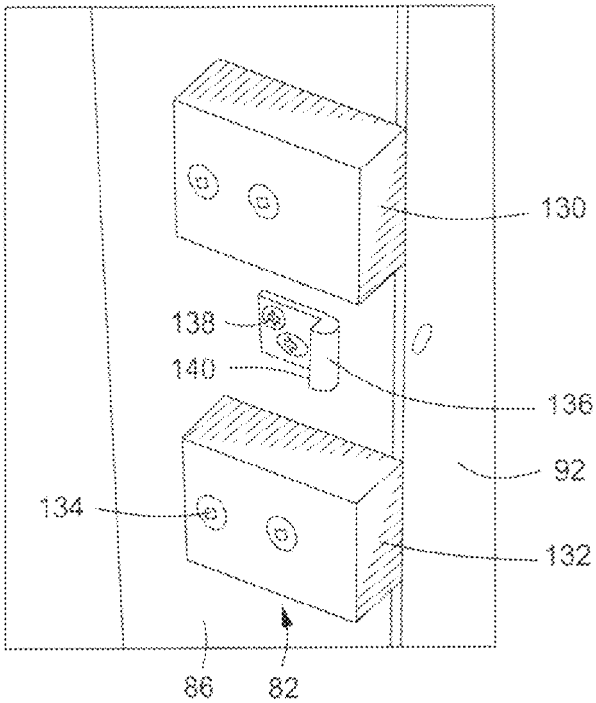
Figure 26:
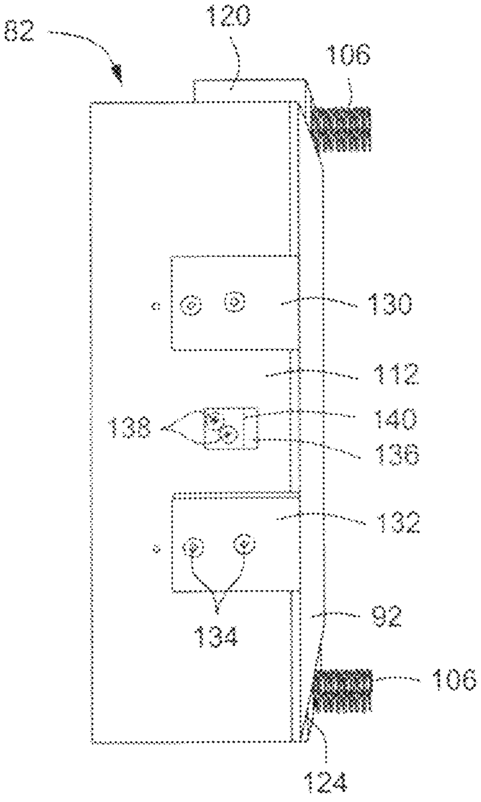
Figure 27:
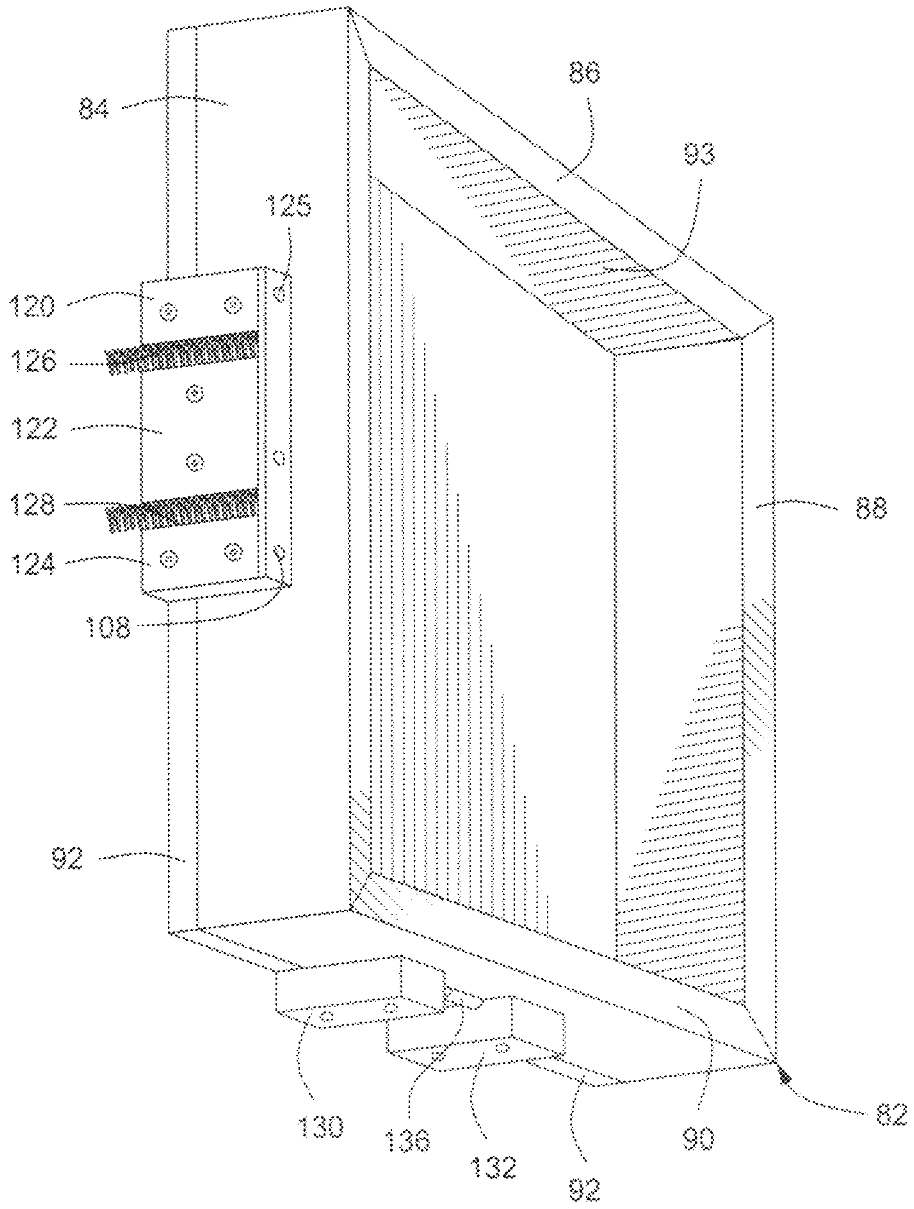
Figure 28:
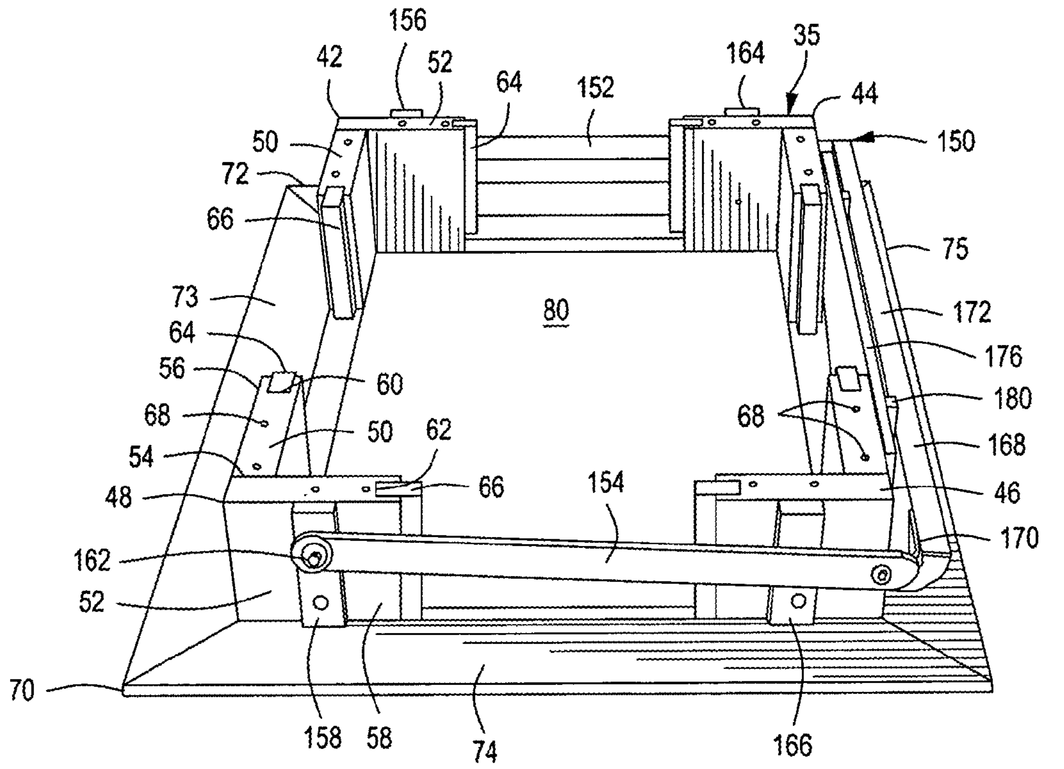
Figure 29:
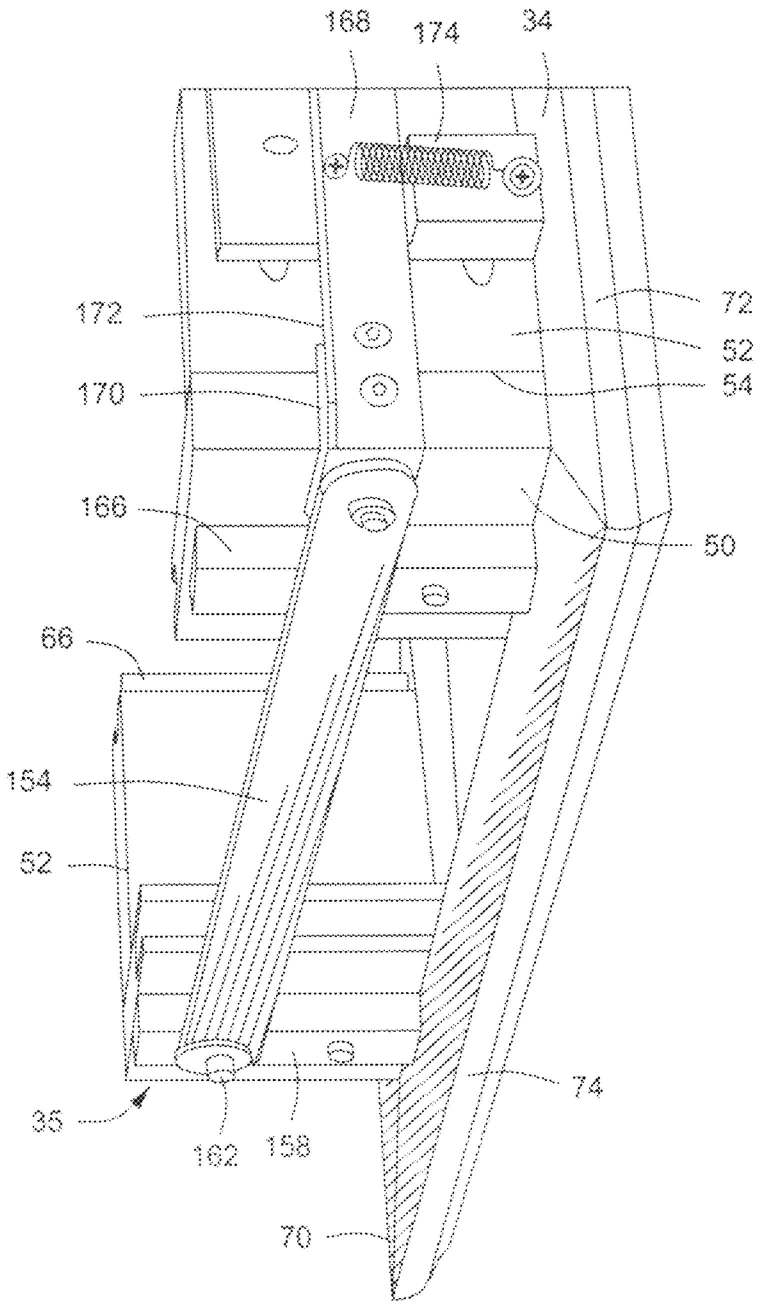
Figure 30:
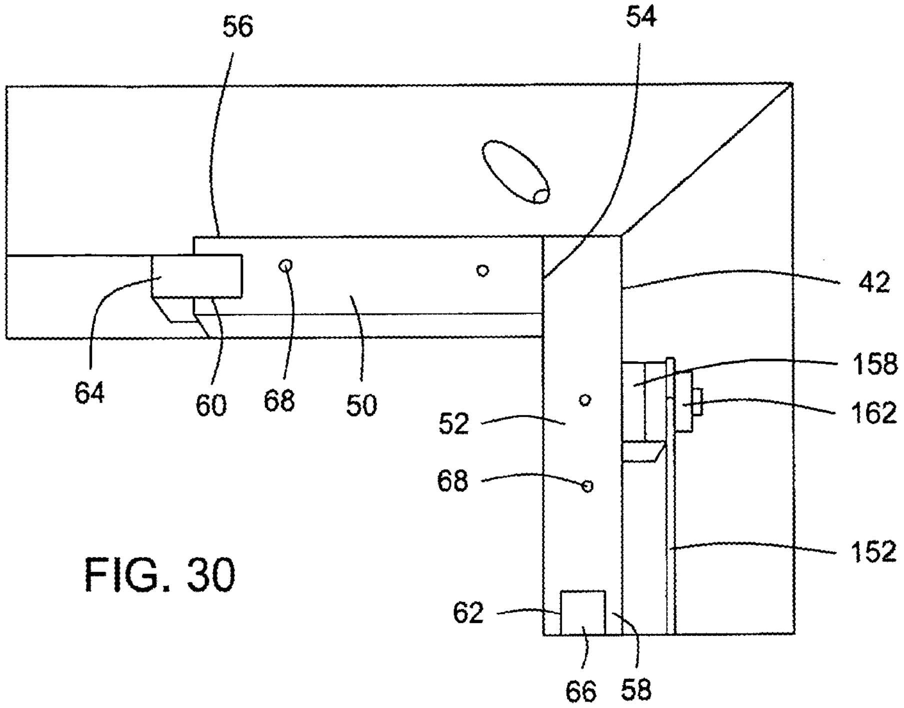
Figure 31:
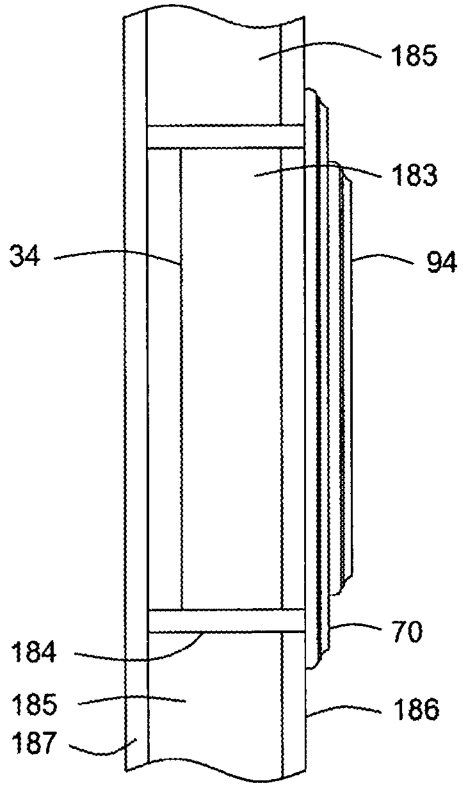
Figure 32:
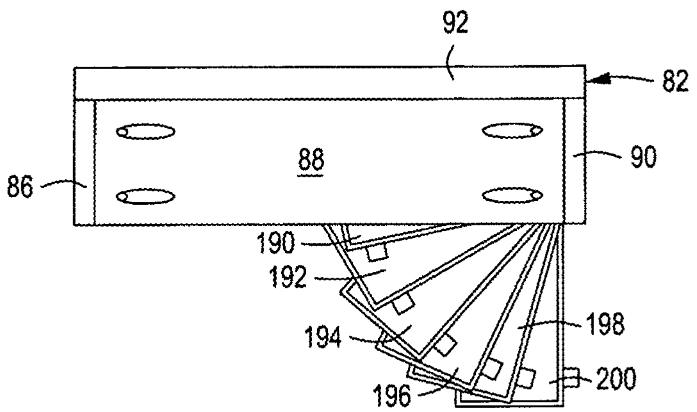
Figure 33:
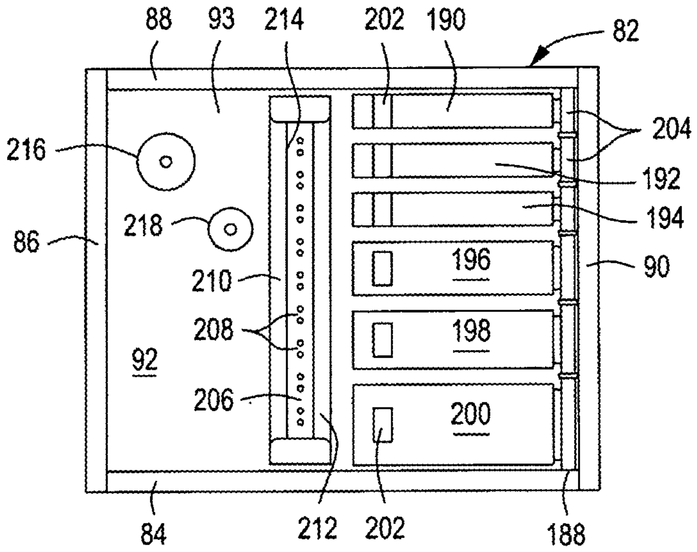
Figure 34:
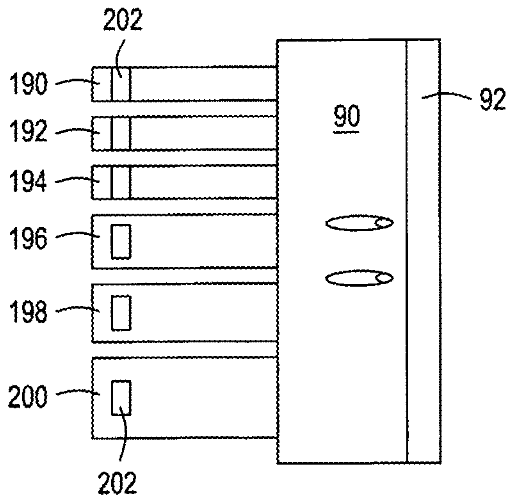
Figure 35:
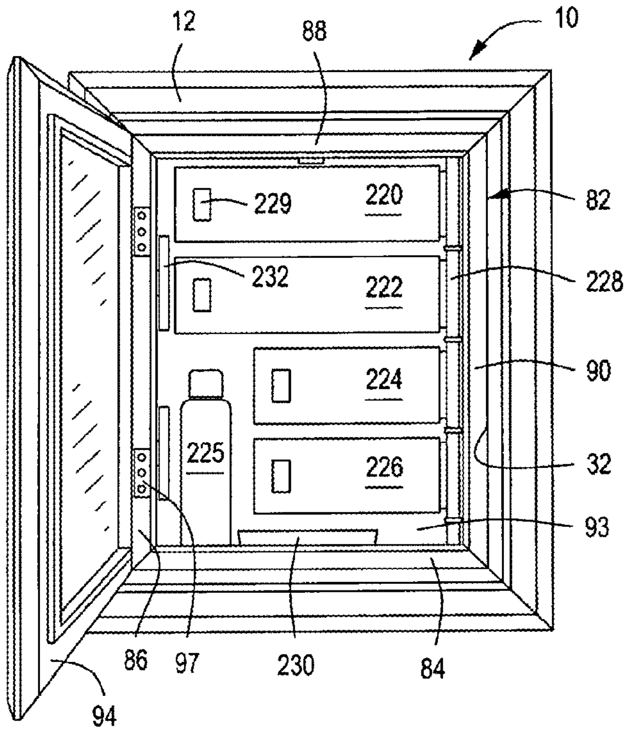
Figure 36:
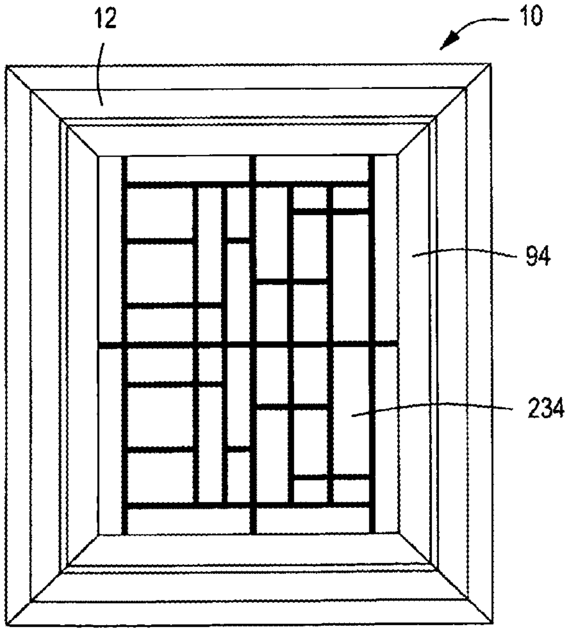

FIG. 2 is a perspective view showing the wall mounted personal cabinet of FIG. 1 in its closed configuration;

FIG. 3 is a front elevation view further illustrating the personal cabinet of the embodiment shown in FIGS. 1 and 2;

FIG. 4 is a bottom elevation view showing the personal cabinet of the present invention with the inner case thereof at its projected and closed condition;

FIG. 5 is a bottom view similar to that of FIG. 4 showing the closure of the personal cabinet in its open condition;

FIG. 6 is a front elevation view of a housing mount in the form of a picture frame having a generally rectangular housing mount receptacle which is adapted to receive the actuator housing structure of the personal cabinet;

FIG. 7 is a side perspective view showing further details of the picture frame housing mount of FIG. 6;

FIG. 8 is an perspective view taken from one side and showing the rear surface structure of the picture frame housing mount of FIGS. 6 and 7 and particularly illustrating a plurality of fastener receptacles within which screws or other fasteners are located to provide for retention of the back panel structure within a back panel receptacle of the housing mount;

FIG. 9 is a left side elevation view showing the actuator housing structure, with the inner case extended to its projected position and showing the latch and latch actuator mechanism of the actuator housing structure in its unlatched condition;

FIG. 10 is a elevation view showing the extended or projected position of the inner case relative to the actuator housing structure and showing compression springs and spring guide members by which spring force is applied between the inner case relative to the actuator housing structure;

FIG. 11 is a partial side elevation view showing a portion of the latch release mechanism and illustrating one of its positioning springs;

FIG. 12 is a partial side elevation view of the of the inner case and further showing in detail the guide members, the spring and spring guide members and a portion of the closure mounting hinge;

FIG. 13 is a perspective view showing an intermediate portion of the bottom of the actuator housing structure in detail;

FIG. 14 is a elevation view showing the extended or projected position of the inner case relative to the actuator housing structure and further showing the latch and latch release mechanism in its unlatched condition;

FIG. 15 is a side view showing the extended or projected position of the inner case relative to the actuator housing structure and further showing the latch and latch release mechanism in its unlatched condition;

FIG. 16 is a side elevation view showing the closure member and further showing the mounting hinge for the closure member;

FIG. 17 is an elevational view showing the back side of the closure member and further showing the position of the closure mounting hinge relative to an edge of the closure member;

FIG. 18 is a perspective view showing the rear portion of the actuator housing structure and illustrating the latch and latch release mechanism in detail;

FIG. 19 is an perspective view showing a part of the actuator housing structure and its latching and latch releasing mechanism in detail;

FIG. 20 is an exploded side view showing the panel member being separated from the side and end panels of the actuator housing structure;

FIG. 21 is also an exploded perspective view taken from the side and showing the back panel of the actuator housing structure being separated from the side and end panels by removal of fastener members and showing the springs and spring guide members in detail;

FIG. 22 is a perspective view showing the inner portion of the back panel member of the actuator housing and showing the spring guide members projecting therefrom;

FIG. 23 is an elevational view showing a portion of the actuator housing structure with its back panel member removed to more clearly show the compression spring arrangement;

FIG. 24 is a side elevational view showing the spring and guide members in detail;

FIG. 25 is an perspective view showing an intermediate portion of one end of the actuator housing structure and showing guide block members and a latch member positioned thereon;

FIG. 26 is an end elevational view showing the actuator housing structure of FIG. 25;

FIG. 27 is an perspective view showing the actuator housing structure and the storage compartment thereof;

FIG. 28 is a front perspective view showing the construction details of the actuator housing structure;

FIG. 29 is an perspective view in greater detail as compared with FIG. 28 and showing a portion of the actuator housing structure;

FIG. 30 is a partial perspective view in plan showing one of the corner structures of the end and side wall assemblies of the actuator housing structure;

FIG. 31 is a sectional view showing a portion of a wall structure of a residence or other building having a cabinet mounting opening formed therein and having the personal cabinet of the present invention mounted therein;

FIG. 32 is a plan view showing an example of the inner case compartment structure of the personal cabinet of the present invention with a plurality of item storage trays that are pivotally and removably mounted to the cabinet and are pivotally moveable to stored positions within the inner case compartment and to outwardly extended positions permitting access to items located therein;

FIG. 33 is a front elevation view of the example presented in FIG. 32 showing the inner case compartment of the personal cabinet, showing the item storage trays and further showing internal support devices of the personal cabinet;

FIG. 34 is a side elevation view showing the inner case compartment of the personal cabinet example with the pivotally mounted item storage trays all positioned at their outwardly extended positions;

FIG. 35 is a front elevation view of the example configuration for the personal cabinet of the present invention showing the pivotally mounted closure member at its open position and showing the inner case compartment of the personal cabinet with a plurality of pivotally mounted item storage trays at stored positions within the compartment; and FIG. 36 is a front elevation view of the example configuration for the personal cabinet of the present invention showing the pivotally mounted closure member at its closed position and showing a housing panel which forms a part of the closure member.

DETAILED DESCRIPTION OF PREFERRED EMBODIMENT

Referring now to the drawings and particularly to FIGS. 1-8, a wall mounted personal cabinet for a wide range of personal items such as jewelry, collectibles, smoking implements and products, etc. is shown generally at 10. The personal cabinet has a housing mount shown generally at 12 which has the general appearance of framed artwork. As shown in FIG. 6 and by the rear view of FIG. 8 the housing mount 12 defines a back or rearwardly facing recess 13 within which is received a back panel 18 of generally rectangular configuration having a rectangular opening therein. The back panel may be an integral structure if desired, however to permit disassembly of the back panel for purposes of making repairs to internal components of the personal cabinet the back panel 18, as shown in FIG. 8, is preferably composed of side panel strips 20 and 21 and upper and lower panel strips 22 and 23 that are joined in any suitable fashion. Multiple angulated fastener openings 19 are formed in the back panel thus providing for screw or other fastener retention of the back panel 18 within the rearwardly facing recess 13 of the housing mount 12.

As shown in FIGS. 1-7 the housing mount 12 is preferably defined by side molding members 14 and 15 and upper and lower molding members 16 and 17 that are joined to one another at beveled ends so as to represent the appearance of a picture frame. For hanging of the housing mount 12 on a wall structure of a residence or other building suitable threaded support eye members, not shown, may be screwed into the rear surfaces of the back panel 18 so that a support wire or cord may be connected to the support eye members for support of the personal cabinet on any suitable picture hanger devices. In the event the personal cabinet and its contents are heavier that can be safely supported by conventional picture hanger devices the back panel 18 of the housing mount 12 may be adapted to receive a French cleat that is fixed to a wall structure. Thus, the personal cabinet may be supported on a wall structure in any suitable manner that ensures safe and efficient support thereof.

As shown in FIGS. 6 and 7, the assembled molding members 14-17 of the housing mount 12 and the back panel 18 cooperatively define a housing mount receptacle 32 which is shown in the drawings to be of rectangular configuration. However, it should be borne in mind that the configuration of the housing mount receptacle 32 may have other suitable forms, such as oval, triangular, octagonal, etc. without departing from the spirit and scope of this invention. The back panel 18 with its panel strips 20-23 constitute a closure or back surface of the housing mount receptacle 32. It should also be borne in mind that the housing mount receptacle 32 may be defined by a housing frame structure that is fixed within the structure of a wall of a residence or other building as shown in FIG. 31. In the event the personal cabinet 10 is intended to be mounted or recessed within a wall, the embodiment of FIG. 31 thus represents an alternative embodiment of the present invention where an opening in a wall structure constitutes a housing mount and defines a housing mount receptacle and is discussed in detail below.

The housing mount receptacle 32, whether defined by a housing mount 12 as shown in FIGS. 6 and 7 or defined by a prepared wall opening as shown in FIG. 31, serves as a receptacle for receiving an actuator housing structure shown generally at 34 which is described in detail in connection with FIGS. 9-30. As shown in FIGS. 9 and 18-22, the actuator housing structure 34 has a wall structure shown generally at 35 having its inner extent defined by a generally rectangular panel or frame member shown generally at 36. The panel or frame member 36, as is evident in FIGS. 18-20 and 22, is defined by side strip members 38 and 39 and top and bottom strip members 40 and 41 that are interconnected in any suitable fashion. Though for purposes of access for repair and for minimizing weight the panel or frame member 36 is preferably composed of assembled strips of wood or other suitable material and defines a central opening. If desired the back panel or frame member 36 may have the form of an integral panel that is fixed to the wall structure 35.

As shown in FIGS. 18 and 21 best shown in FIGS. 28-30 the wall structure 35 of the actuator housing 34 is defined in part by a plurality of corner wall segments 42, 44, 46 and 48 to which the panel or frame member 36 is fixed. Referring specifically to FIGS. 18, 19 and 28, each of the corner wall segments is defined by straight wall sections 50 and 52 that are connected at a corner joint 54. Ends 56 and 58 of the straight wall sections 50 and 52 define slots 60 and 62 within which are mounted guide members 64 and 66. The guide members may be composed of a wide range of acceptable low friction materials; however for purposes of the present invention the guide members may be composed of a polymer material such as polyethylene, polytetrafluoroethylene or any relatively rigid material that minimizes frictional resistance with wood or other dissimilar materials and retains its form for long periods of time.

The corner wall segments are each provided with fastener openings 68 as shown in FIG. 28 that permit screws or other suitable fasteners 69 shown in FIG. 18 to extend through the generally rectangular back panel member 36 and be threaded into the corner wall segments, thus retaining the generally rectangular back panel member 36 in fixed relation with respect to the corner wall sections of the wall structure 35. The top, bottom and side strips of the back panel member 36 are individually fastened by screws, thus permitting selected strips to be released and removed in the event access to the internal components of the actuator housing structure 34 is needed for purposes of replacement or repair.

As shown in FIGS. 9-11, 14, 15 and 18-28 a generally rectangular housing panel 70 is also fixed to the corner wall segments by means of suitable fastener members such as screws which may be located within angulated fastener receptacles that are machined or otherwise formed in the bottom or inner surface portions of the housing panel. The housing panel 70, as shown in FIG. 28 is preferably composed of top and bottom panel strip members 72 and 74 and side panel strips 73 and 75 that are joined to one another at 45° beveled ends. However, if desired, the housing panel 70 may take the form of an integral panel member of decorative character. The edges of the housing panel 70 extend well beyond the exterior surfaces of the corner wall segments as shown in FIGS. 9-11, 28 and 29 so that the outer edges of the housing panel will overlie the side and end edges 76 and 78 of the decorative molding components of the support mount 12 as shown in FIGS. 1 and 2. This feature, shown in FIG. 2, ensures that the presence of a actuator housing structure beneath the housing panel is not apparent when the personal cabinet is closed and latched.

As shown in FIG. 28 the actuator housing structure 34, including its rectangular inner frame 36 and housing panel 70, define a storage compartment receptacle 80 of a desired configuration that is substantially matched by the configuration of a moveable article containing inner case structure shown generally at 82 in FIGS. 10 and 27. As shown in the drawings, the actuator housing structure defines a generally rectangular actuator housing receptacle 80 and the article containing inner case structure 82 also has a rectangular external configuration of sufficient dimension to be received within the actuator housing receptacle 80. The article containing inner case structure 82 is linearly moveable relative to the actuator housing structure 34 and housing mount 12 to a contracted position within the storage compartment receptacle 82 shown in FIG. 2 and an extended or projected position shown in FIGS. 1, 4-6, 9 and 10. This linear movement is substantially perpendicular to the rear or bottom surface of the housing mount 12, thus permitting the moveable inner case 82 to be moveable toward a wall of a building during retracting movement and moveable away from the wall during extension movement.

As shown in FIGS. 1, 27 and 33 the moveable inner case 82 is shown to be of generally rectangular configuration, though it may have other external configurations that match the configuration of the actuator housing receptacle 80. The inner case, as is evident from FIGS. 1, 26, 27 and 33, is defined by straight wall members 84, 86, 88 and 90 that are connected and form rectangular walls and is further defined by a compartment bottom or rear wall panel 92 that is fixed to the straight wall members. The straight wall members and the compartment bottom or rear wall panel collectively define an inner case compartment 93, best shown in FIGS. 1, 27 and 33 for containing various types of personal articles according to the intended use of the personal cabinet. The inner case 82 is intended to be linearly moveable to a contracted position where it is locked against movement and is linearly moveable to a projected or extended position to permit access to the contents thereof. This linear retracting and extending movement is in a direction that is substantially perpendicular to a wall on or within which the personal cabinet is mounted. This feature enables the user to achieve retracting movement of the inner case simply by pushing it toward the wall on or within which the personal cabinet is mounted. However, if the personal cabinet is supported on a horizontal surface, such as a table or counter-top then linear movement of the inner case 82 to its contracted and extended positions will be substantially vertical.

A closure member 94 is pivotally mounted to the straight wall member 86 by one or more hinges 96 as shown in FIGS. 1, 5, 9-11, 16 and 17 and is pivotally moveable to open and closed positions. It is desirable that the closure member be prevented from opening movement when the inner case 82 is located at its contracted position, thus providing a measure of security for the articles contained therein. As shown in the drawings a single hinge 96 is employed, the flanges of the hinge being fixed to the straight wall member 86 and the closure member 94 by means of fasteners such as screws that extend through holes of the flanges. To prevent opening of the closure in the contracted position of the inner case 82 the pivot point 95 of the hinge 96 is positioned in offset parallel relation with an edge 98 of the closure member 94 as shown in FIG. 17. Thus, when the inner case 82 is contracted a flat inner or back surface 100 of the closure 94 will be located essentially co-planar and in engagement with the upper surface 102 of the housing panel 70. When this condition exists the edge portion of the closure member 94 that extends beyond the pivot point 95 of the closure mounting hinge 96 to the edge 98 will be prevented from arcuate movement by the upper surface 102 of the housing panel 70, thus preventing opening of the closure member. When the inner case 82 has been moved outwardly to its extended or projected position, such as shown in FIGS. 1, 14 and 15, the closure member can be freely rotated from its closed position to its open position. When fully open, the extending portion of the closure member 94 will contact an external wall surface of the storage compartment wall member 86, as shown in FIG. 5, thus limiting pivotal opening movement of the closure member 94 to rotation of about 90° from its closed position.

It is desirable to latch the inner case 82 at its contracted position so that the closure member 94 cannot be opened and, when opening of the closure member is desired, it is desirable to release the contracted and latched position of the inner case 82 for automatic movement to its projected position. To accomplish this feature, as shown in FIGS. 11, 13 and 20-26, a plurality of spring guide members 104, such as cylindrical wood dowels, are fixed to the rectangular inner frame member 36 and serve as guides for a like number of helical compression spring members 106. As shown in FIGS. 23, 24, 26 and 27 the compression spring members 106 are arranged to apply spring force to the rectangular inner frame member 36 and to an external lateral flange 108 that is fixed to guide block members 120, 122 and 124 that are mounted to the wall structure of the moveable inner case 82. The external lateral flange 108 may be composed of wood or polymer material if desired, however according to the preferred embodiment disclosed herein the external lateral flange 108 is defined by a plate member composed of aluminum which is fixed to guide block members of the inner case by means of screw fasteners 125 as is evident in FIG. 27. Ends of the compression spring members 106 are disposed in force transmitting engagement with the lateral flange 108 and thus provide motive force to move the inner case to its extended or projected position when a latch mechanism is released from its latched condition. Though compression springs provide for simple and efficient movement of the moveable inner case, other types of compartment actuating devices may be employed within the spirit and scope of the present invention. For example, a sissors or linkage type jack mechanism may be employed to cause controlled extension and retraction movement of the moveable inner case. Also an electric motor driven actuator may also be employed to cause controlled extension and retraction movement of the moveable storage compartment.

The guide block members 120, 122 and 124 are laterally spaced as shown in FIGS. 10, 12, 23, 24 and 27, thus defining guide slots 126 and 128 within which the spring guides 104 and compression springs 106 are located. The guide block members on either side of the guide slots provide a guiding function and prevent lateral bending of the compression springs as they are compressed during retraction movement of the inner case. The spring guide members 104 also serve to provide a controlling function for the compression springs as the spring guide members are moved during retracting and projecting movement of the inner case 82. To limit the amount of outward projecting movement of the moveable inner case 82 the walls 86 and 90 are provided with spaced pairs of stop blocks 130 and 132 as shown best in FIGS. 25-27 which are fixed to the inner case walls by fasteners such as screws 134. When the moveable inner case has been moved outwardly to its maximum extent by the force of the compression springs 106 the stop blocks 130 and 132 will come into contact with an inner surface of the housing panel 70 thus limiting further extension movement of the inner case. At this point the compression springs will still be under somewhat reduced spring load, thus ensuring complete outward projecting movement of the moveable inner case when the latch mechanism of the personal cabinet has been released.

It is desirable to move the inner case 82 to its fully seated and latched condition relative to the actuator housing structure 34 and to ensure in this seated condition that the closure member cannot be opened. To accomplish this feature, as shown in FIGS. 25 and 26, the upper and lower walls 86 and 90 of the moveable inner case 82 are each provided with a latch device 136 which is retained in assembly with inner case walls by fasteners 138 such as screws. Each latch device 136 defines a latch shoulder 140 is disposed for latching engagement by a pivotally moveable spring urged latch member 142, shown in FIGS. 9 and 21. The latch member 142 is supported within a latch bracket 144 that is mounted to the inner surface 146 of the upper and lower end frame members 40 and 41 of the rectangular frame or panel member 36. When the moveable inner case 82 has been moved inwardly to its maximum extent of its retracting movement the latch devices 136 engage the pivotally moveable spring urged latch members 142 and move to a position permitting the latch members to establish latching engagement with the latch shoulders 140. Inward movement of the moveable inner case causes the compression spring members 106 to be loaded with additional spring force. This latching engagement secures the moveable inner case at its contracted position as shown in FIGS. 2 and 31, preventing extension movement of the inner case by the force of the loaded compression springs 106 until such time as the latched condition of the latch mechanism has been released.

When the moveable inner case 82 has been contracted inwardly to its maximum extent the flat inner surface 100 of the closure member, as shown in FIGS. 9-11, will be essentially in surface to surface contact with the outer surface 102 of the housing panel 70. Since the pivot point or line 95 of the closure mounting hinge 96 is offset from the edge 98 of the closure member 94 as shown in FIG. 17 the closure edge 98 will bear against the upper surface of the housing panel 70 and will prevent the closure from pivoting toward its open position. For opening of the closure member 94 it is necessary that the moveable inner case 82 first be released from its latched contracted condition and that it be moved outwardly to a projecting position. This activity is initiated by actuation of a latch release actuator mechanism shown generally at 150 in FIGS. 11, 13-15 and 18-21 which releases the latches 142 and permits extension movement of the inner case 82 by the force of the compression springs 106.

Referring to FIGS. 9, 11, 13-15 and 18-21, the latch release actuator mechanism 150 incorporates latch engaging bars 152 and 154 that are pivotally mounted to spacer members 156 and 158 by pivot mounts 160 and 162. Other spacer members 164 and 166 cooperate with the spacer members 156 and 158 to maintain the latch engaging bars 152 and 154 in properly spaced relation with exterior surfaces of the straight wall sections of the actuator housing structure 34, thus minimizing any potential for frictional resistance to latch release actuator movement. As shown in FIGS. 18 and 20, a latch actuator bar member 168 has each end thereof connected with an end of one of the latch engaging bars 152 and 154 by means of angle connectors 170 so that movement of the latch actuator bar is translated to pivotal movement of the latch engaging bars 152 and 154.

The latch actuator bar member 168 defines a laterally projecting flange 172 having spaced openings permitting the connecting ends of a plurality of latch actuator return spring members 174 to be connected therewith as shown in FIGS. 18, 19, 28 and 29. The spring members 174 are shown to be tension springs though it is to be borne in mind that any sort of spring or other urging member may be employed to return the latch actuator mechanism to a desired position after latch release actuation has been accomplished. A mounting panel 176, shown in FIG. 18 is fixed to the wall structure of one side of the actuator housing structure 34 by fasteners 178 such as screws. Guide strip members 180 project outwardly from the mounting panel 176 and serve as low friction guides that are engaged by the actuator bar member 168 during its latch release and return movement.

Latch release actuation can be achieved manually or via any suitable motorized system, including solenoid actuation, electric motor actuation, with actuation by remote signal control if desired. For manual latch release actuation, as shown in FIGS. 15, 20, 21 a latch release pin 181 extends through a hole that is formed through the housing panel 70. The latch release pin 181 is moveable within the hole, with one end thereof engaging the laterally projecting flange 172 of the latch actuator bar member 168. For latch release an implement is used to engage the exposed end of the latch release pin 181 and sufficient manual force is applied to the latch release pin to move the latch actuator bar member 168 against the bias of the tension springs 174 and move the latch member to its release position. In the event an automated mechanically or electrically energized latch release mechanism is employed its electrical circuit can be actuated via a switch or my means of a remotely generated latch release signal. A motor of any suitable character will then be electrically energized to impart a force to the latch actuator bar member 168. When latch release occurs, the stored energy of the compression springs 106 will move the inner case 82 outwardly to its projected position. After this has occurred the closure member 94 may be opened to gain access to the inner case compartment 93. A motorized system may also be employed for moving the inner case from its extended position to its contracted and latched condition.

Though the actuator housing structure 34 is shown in the drawings to be mounted within a rectangular housing mount receptacle 32 of the support mount 12 it is to be borne in mind that the rectangular housing mount receptacle may instead be defined by the structure of a wall as shown in FIG. 31. Thus, a prepared opening in a wall structure constitutes a housing mount and defines a housing mount receptacle such as that shown at 32. This feature permits the actuator housing structure 34 to be fixed within the housing mount receptacle of a wall when desired. If desired, the actuator housing structure 34 may be interchangeable with respect to a housing mount receptacle of a wall or the receptacle of a housing mount 12 such as a housing mount having the appearance of a picture frame. The sectional view of FIG. 31, illustrates a wall structure 182 of a building having a rectangular opening 183 therein which is the equivalent of the housing mount receptacle 32 shown in the embodiment of FIGS. 6 and 7. Typically the rectangular opening 183 will be defined by trim material 184 that is fixed to wall studs 185 and to wallboard 186 and 187. The rectangular opening 183 is of a suitable dimension for receiving the generally rectangular actuator housing structure 34 therein so that the actuator housing may be permanently secured in place or releasably secured by fasteners such as screws. In this case, the housing panel 70 will be disposed in face to face relation with the outer surface of the wall 182 so that the installed personal cabinet will have the appearance of framed artwork. Obviously, a picture frame type housing mount such as that shown at 12 in FIGS. 1, 2 4 and 5 will not be employed. The function of the personal cabinet apparatus will be the same as discussed above.

Operation

Retracting and Latching:

Regardless whether the generally rectangular actuator housing structure 34 is to be mounted within a picture frame type housing mount 12 shown in FIGS. 1-30 or is to be mounted within a wall opening as shown in FIG. 31, for manual operation, with the personal cabinet 10 having its moveable inner case 82 extended outwardly to its projected position, the user will simply apply manual force to the closed closure member 94, thus moving the inner case inwardly to its contracted position. At this position the latch members 142 will establish latching engagement with the latch shoulders 140 of the latch devices 136. Moving the inner case to its latched position causes additional compression or loading of the compression springs 106 so that in its contracted condition the inner case is held in place by the latch mechanism against the bias of the compression springs. Though the closure member 94 is exposed at this point, it cannot be opened since the pivot point of its hinge is offset from an edge of the closure member, thus causing the housing panel 70 to interfere with the arcuate movement of the closure edge that must take place during opening movement of the closure. The off-set positioning of the hinges permits opening of the closure member only when the moveable actuator housing structure is at its extended or projected position. This feature prevents the closure from being opened when the moveable frame is contracted and latched.

Latch Release and Compartment Projection:

When it is desired to open the personal storage cabinet the user will actuate the latch mechanism to its release condition. In the case of manual unlatching, the user will apply an inwardly directed force to a latch release pin 181 which in turn causes application of the force to a latch release bar 172 of the latch release mechanism 150, pivoting the latch engaging bar members 152 and 154 to positions engaging and moving the pivotally mounted spring urged latch members 142 to a position releasing restraining engagement with the latch shoulder 140 of the latch device 136. This latch releasing activity causes loading of tension springs which serve to return the latch release mechanism to a non-latching position when the latch actuating force is removed. When unlatched, the plurality of compression springs 106 will release their stored spring energy and serve to move the inner case linearly from its contracted and latched position to an extended or projected position. At the extended position the closure member will have moved away from the housing panel 70 so that it may be pivotally rotated to its open position permitting access to the contents of the inner case compartment 93.

Referring now to FIGS. 32-36 it should be borne in mind that the personal cabinet of the present invention may serve to contain a wide variety of personal items, such as for jewelry items, keys to locks within the household, small firearms, personal collectibles, etc. The personal cabinet may also serve as a humidor for storage of tobacco products and smoking implements if desired.

Thus, as shown in FIGS. 32-36, the internal components of the moveable inner case 82 will be provided with various mounting, support and container devices that adapt its storage space 93 for accessible storage of a wide variety of small personal items. It is intended that the trays and other items within the inner case compartment 93 are representative of one suitable mode of the present invention and that it not be considered as restricting the spirit and scope of the invention. The inner case compartment may be completely empty if desired or it can be fitted with other article support or containment devices as is intended by the user As shown in the plan view of FIG. 32, the straight wall members 84 and 88 are bottom and top walls of the moveable inner case 82 and straight wall members 86 and 90 are side wall members. The wall panel 92 comprises the rear or bottom wall of the moveable inner case. An elongate pivot member 188 has its upper and lower ends fixed to the top and bottom walls 88 and 84 and provides pivotal support for a plurality of article storage trays 190-200. Each of the article storage trays is provided with a small operating handle or knob 202 which permits each tray to be manipulated manually simply by grasping an operating handle and applying manual force to pivotally move it to its stored position within the inner case compartment 93 or to its extended position to permit access to articles contained therein. Each of the article storage trays 190-200 is also provided with a releasable pivot member 204 having releasable pivotal engagement with the elongate pivot member 188, thus permitting the article storage trays to be removable from the inner case compartment in the event such is desired. Typically the releasable pivot members 204 are of generally tubular configuration with a slot along one side thereof to permit each of the pivot members to simply be manually moved to a release position. The user is then enabled to move the selected article storage tray to a table or dresser top surface for access to and use of items contained therein. The article storage trays are easily and simply released and withdrawn from the inner case compartment 93 and replaced without any requirement for tools or other release devices. However, the releasable pivotal mounts for the article storage trays may have any other form that is suitable for providing pivotal support for storage trays and permitting the storage trays to be removed and replaced.

For support of small and easily misplaced devices such as ear stud jewelry items, a support panel 206 defines multiple sets or pairs of holes 208 that receive the ear stud members of ear rings and thus support the ear stud members in organized and stored positions until their use is desired. The support panel 206 may be composed of wood, metal, polymer or other suitable, substantially rigid materials without departing from the spirit and scope of the present invention. The support panel 206 is releasably or movably supported within the inner case compartment 93 by spaced panel support members 210 and 212. The spaced panel support members define a slot or receptacle 214 within which a portion of the support panel 206 is received. The support panel may be held in place by means of friction or it may be secured by retainer pins. Alternatively, the support panel may be pivotally mounted to the panel support members, thus permitting it to be pivotally moved to an access position exposing the ear studs so that they can be removed from or replaced within the pairs of holes 208.

One or more necklace holder devices, such as shown at 216 and 218, are mounted to the rear or bottom wall 92 of the moveable inner case 82, permitting a plurality of necklaces, jewelry chains or bracelets to be supported in organized and accessible fashion. The necklace holder devices may be defined by a post that is mounted to the wall 92 and with a plate member being mounted to the free end of the post by means of a suitable fastener such as a screw. Though the plate member is shown to be of circular configuration in FIG. 33 it should be borne in mind that the plate member may be of any other desired configuration that is of pleasing appearance and serves as a retainer to ensure that necklaces or bracelets do not inadvertently fall from the post.

With reference now to FIGS. 35 and 36 the front elevation views show a wall mounted personal cabinet shown generally at 10 and embodying the principles of the present invention. This personal cabined is designed particularly for use as a humidor for storage of and access to tobacco products and smoking implements. As compared with other figures of the drawings, like components are identified by like reference numerals. The housing mount 12 has located therein a generally rectangular actuator housing such as that shown at 34 in FIG. 9 and which defines a housing mount receptacle 32. Within the housing mount receptacle 32 is movably received an inner case 82, also being of generally rectangular configuration and having a top wall 88 a bottom wall 84 and side walls 86 and 90. A closure member or door 94, shown at its open position in FIG. 35 and shown closed in FIG. 36, is pivotally mounted by hinges 97 to the side wall or panel 86 of the movable inner case. The hinges 97 are mounted in offset relation from the edge of the closure member as explained above in connection with FIG. 4, thus ensuring that the closure member may be opened only when the moveable inner case 82 has been released from its latched condition and moved to its extended or projected position.

Within the moveable inner case structure 82 a plurality of article storage trays 220, 222, 224 and 226 are pivotally mounted in much the same manner as discussed above in connection with FIGS. 32-35. An elongate pivot member is mounted with its upper and lower ends being fixed to the upper wall member 88 and the lower wall member 84 of the moveable inner case 82. Each of the article storage trays is provided with a pivot mount such as shown at 228, thus permitting the storage trays to be pivotally moved from a stored position within the inner case compartment 93 to an extended position such as is shown in FIGS. 32 and 34 for access to the articles that are stored within the trays. Each movable storage tray will also be provided with a handle such as shown at 229 to permit a user to grasp the handle and manually move the selected tray to a desired position. In the case of a personal humidor cabinet the trays will typically contain tobacco products such as cigars or may contain pipe or cigarette tobacco as well as implements that are typically utilized for tobacco smoking. The rather short length of the pivotally mounted trays 224 and 226 provides a space within the inner case compartment for location of a bottle or other container 225 of any desired nature. When the personal cabinet has the form of a humidor for tobacco products, the container 225 may comprise a liquid dispenser with an exposed wick for liberating moisture into the compartment space, thus minimizing the potential for evaporation of moisture from tobacco products. The liquid may simply be water or a mixture of water and a flavoring agent to provide the environment within the compartment with a desired scent or flavoring characteristic.

In the case of a personal humidor cabinet it will be appropriate to provide the interior of the personal cabinet with apparatus to maintain optimum conditions for the preservation of tobacco products. For example a humidifier device 230 is mounted to an interior surface of the bottom wall 84 and a temperature controller device 232 is mounted to an interior surface of the side wall member 86 as shown. The humidifier and temperature controller devices may take the form of simple passive mechanical devices that are manually loaded as desired or they may be electrically controlled devices that may be powered by batteries or by electrical energy provided from a transformer connected with house current.

As evidenced by FIG. 36, the closure member 94 may be provided with a decorative panel 234, which may take the form of a stained glass panel as shown, a framed painting, a print of a desired artwork. Alternatively the closure member may simply be provided with a decorative panel composed of any suitable material such as wood, polymer, metal or a composite of materials to provide the closure with a decorative and pleasing appearance.

It should be borne in mind that the spirit and scope of the present invention is not intended to be limited to the specific jewelry support elements that are shown in the photographs. The spirit and scope of the present invention is intended to provide for storage and access to many other types of personal items; for example a smoking pipe collection, tobacco and other smoking materials for men and women, coin collections, stamp collections, without limitation. The concept of the present invention is the provision of a personal cabinet which has the general appearance of a decorative wall supported device such as an elegantly framed picture, painting or other piece of artwork. The personal cabinet cannot be opened until an inner frame or enclosure is unlocked and moved to a position of access. Only then can a door or closure member be opened to permit access to the stored contents of the inner case compartment.

In view of the foregoing, the features that are particularly important to the present invention comprise the following:

A wall mounted personal cabinet is provided that is designed to be supported on a wall surface without altering the structure of the wall, except for installation of a picture frame type supports or a French cleat if needed for support of the weight of the cabinet. The personal wall mounted storage cabinet is adapted to be supported at least partially within a wall structure, and may have the general appearance of a decorative wall hanging such as a framed picture, painting or other object of art to provide the cabinet with a pleasing decorative appearance.

The personal cabinet is provided with a moveable inner case is retractable into an inner case receptacle of an actuator housing and is projected from the cabinet for access to the contents of the inner case compartment. The moveable inner case is spring loaded via compression springs of the actuator housing when contracted and is latched at its contracted position by one or more latch mechanisms and released by unlatching actuation of the latch mechanisms that are present within the actuator housing. The latch mechanisms may be released mechanically by manual latch release actuation or may be released by an electrical or electromechanical mechanism in response to a remote signal from a hand-held signal transmitting device.

The personal cabinet incorporates a support mount or base that is designed for mounting on a wall or within a wall and defines a receptacle within which a moveable storage compartment is guided during retracting and projecting movement by means of guide strips and guide slots. A closure or door of the cabinet is mounted on the moveable storage compartment and, because of the off-set location of its hinges with respect to an edge of the door, is capable of being opened only after the moveable storage compartment has been unlatched and moved outwardly to a projected position by spring force or by a mechanical or electromechanical actuator mechanism. The decorative storage compartment closure typically has the appearance of a framed painting, photograph, artwork or the like. The closure defines a receptacle within which an item of artwork, such as a stained glass panel, photograph, painting or the like is removably mounted.

Pivotally moveable trays or containers are located within the storage compartment and are used to store any suitable personal items. The trays are removably mounted within the storage compartment and may be removed from the compartment for ease of access to and use of the contents if desired. The trays may be composed of wood, plastic, wire, etc. and are individually pivoted from a contracted storage position to an extended position permitting ease of access to the contents of the trays. The pivotally moveable trays may contain jewelry items when the unit is so used; however the pivotally moveable trays may contain tobacco materials and implements when the unit is intended to serve as a humidor for tobacco products. The personal cabinet unit may also have many other uses, such as providing a secure storage facility for coin collections, stamp collections and other personal items, without limitation.

When the personal cabinet is used for storage of jewelry items a moveable panel is provided within the storage compartment and is provided with multiple pairs of openings for support of ear rings and other similar jewelry items. The moveable panel may be completely removed from the storage compartment to permit ease of access to selected ear rings or other items. Internal hanger devices are mounted within the storage compartment for support of necklaces, bracelets and the like.

Thus, it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended.

I claim:

1. A personal cabinet, comprising:

a wall of a building defining a housing mount receptacle therein;

an actuator housing being supported within said housing mount receptacle and defining an actuator housing receptacle;

an inner article storage case being movably connected with said actuator housing within said actuator housing receptacle and during normal operation being selectively moveable to a contracted position where said inner article storage case is located substantially completely within said actuator housing receptacle and being selectively moveable to a projection position where said inner article storage case is extended at least partially from said actuator housing receptacle;

a closure member being mounted to said inner article storage case and being movable relative to said inner article storage case to an open position permitting access to articles stored therein and to a closed position preventing access to articles stored within said inner article storage case; and said actuator housing preventing opening movement of said closure member when said inner article storage case is located at said contracted position and permitting movement of said closure from said closed position toward said open position only after movement of said inner case from said contracted position toward said projected position.

2. The personal cabinet of claim 1, comprising:

a pivot mount being located within said inner article storage case;

a plurality of storage trays being supported by said pivot mount for individual pivotal movement between a storage position within said inner article storage case and a projected position permitting access to articles within said storage trays; and jewelry hanger members being fixed within said inner article storage case for support of necklaces and bracelets within said inner article storage case.

3. A personal cabinet for jewelry or items, comprising:

a wall of a building defining a housing mount receptacle;

an actuator housing being positioned within said housing mount receptacle and defining an actuator housing receptacle;

an inner article storage case being movably mounted to said actuator housing receptacle and having a contracted position within said actuator housing receptacle and being linearly moveable in a direction away from said wall to a projected position extended at least partially from said actuator housing receptacle;

a latch mechanism having a latched condition retaining said inner article storage case at said contracted position and a release condition permitting projecting movement of said inner article storage case to said projected position;

a latch release mechanism releasing said inner article storage case from said contracted position for movement to said projected position;

spring members being disposed in force transmitting engagement with said actuator housing and said inner article storage case and moving said inner article storage case linearly in a direction away from said wall to said projected position upon release of said latch mechanism; and a closure member being mounted to said inner article storage case and being moveable to open and closed positions relative to said inner article storage case and said actuator housing, at said closed position said closure member being prevented from opening movement by said actuator housing, said closure member being moveable from said closed position toward said open position only when said inner article storage case has been moved linearly from said contracted position toward said projected position.

4. The personal cabinet of claim 3, comprising:

said closure member defining an edge; and a hinge member mounting said closure member to said inner article storage case and defining a hinge pivot offset from said edge and permitting opening movement of said closure member only when said inner article storage case is located at said projected position.

5. The personal cabinet of claim 3, comprising:

a pivot mount being located within said inner article storage case; and a plurality of storage trays being supported by said pivot mount for individual pivotal movement between a storage position within said inner article storage case and a projected position permitting access to articles within said storage trays.

6. The personal cabinet of claim 3, wherein said latch mechanism having a latched position retaining said inner article storage case at said contracted position and a release condition permitting projecting movement of said inner article storage case.

7. The personal cabinet of claim 3, comprising:

stop members within said actuator housing preventing projecting movement of said inner article storage case beyond said projected position.

8. The personal cabinet of claim 3, comprising:

low friction guide members guiding linear projecting and retracting movement of said inner article storage case relative to said actuator housing.

9. The personal cabinet of claim 3, comprising:

said latch mechanism having a latch device fixed to said inner article storage case and defining a latch shoulder;

a pivotally moveable latch member being mounted to said actuator housing and moving into latching engagement with said latch shoulder when said inner article storage case has been moved to said contracted position; and said latch release mechanism being mounted to said housing mount and being moveable to a latch release position engaging and moving said pivotally moveable latch member to a release position releasing latching engagement with said latch shoulder and releasing said inner article storage case for projecting movement to said projected position.

10. The personal cabinet of claim 3, comprising:

said spring members being a plurality of coil spring members disposed in force transmitting engagement with said actuator housing and with said inner article storage case and urging said inner article storage case toward said projected position.

11. A personal cabinet for jewelry and other items, comprising:

a wall structure of a building defining a housing mount receptacle therein;

an actuator housing being mounted within said housing mount receptacle and defining a housing receptacle;

an inner article storage case being movably mounted to said actuator housing within said actuator receptacle and having a contracted position within said actuator housing receptacle and being linearly moveable to a projected position with said inner article storage case extended at least partially from said actuator housing receptacle;

a latch mechanism having a latched condition retaining said inner article storage case at said contracted position and a released condition permitting linear projecting movement of said inner article storage case relative to said housing receptacle;

a latch release mechanism being selectively actuated to release said latch mechanism from said latched condition;

a spring member being disposed in force transmitting engagement with said actuator housing and said inner article storage case and moving said inner article storage case linearly from said contracted position to said projected position upon release of said latch mechanism;

stop members within said actuator housing preventing projecting movement of said inner article storage case beyond said projected position;

a closure member being pivotally supported by said inner article storage case and having an open position permitting access to said inner article storage case and a closed position preventing access to said inner article storage case; and said actuator housing and said inner article storage case preventing opening movement of said closure member when said inner article storage case is at said retracted position and permitting opening movement of said closure member upon movement of said inner article storage case from said retracted position toward said projected position.

12. The personal cabinet for jewelry and other items of claim 11, comprising:

low friction guide members guiding linear projecting and contracting movement of said inner article storage case relative to said actuator housing.

13. The personal cabinet for jewelry and other items of claim 11, comprising:

said latch mechanism having a latch device fixed to said inner article storage case and defining a latch shoulder;

a pivotally moveable latch member being mounted to said actuator housing and moving into latching engagement with said latch shoulder when said inner article storage case has been moved to said contracted position; and said latch release mechanism being mounted to said housing mount and being moveable to a latch release position engaging and moving said pivotally moveable latch member to a release position releasing latching engagement with said latch shoulder and releasing said inner article storage case for projecting movement to said projected position.

14. The personal cabinet for jewelry and other items of claim 11, comprising:

said spring member being a plurality of coil spring members disposed in force transmitting engagement with said actuator housing and with said inner article storage case and urging said inner article storage case toward said projected position.

* * * * *